US012526857B2

(12) United States Patent
Cheong et al.

(10) Patent No.: US 12,526,857 B2
(45) Date of Patent: Jan. 13, 2026

(54) ELECTRONIC DEVICE FOR PROVIDING USER INTERFACE RELATED TO PLURALITY OF EXTERNAL ELECTRONIC DEVICES AND OPERATING METHOD THEREOF

(71) Applicant: SAMSUNG ELECTRONICS CO., LTD., Suwon-si (KR)

(72) Inventors: Gupil Cheong, Suwon-si (KR); Donghyun Kim, Suwon-si (KR); Mingyu Park, Suwon-si (KR); Giho Lee, Suwon-si (KR); Juyeon Jin, Suwon-si (KR); Doosuk Kang, Suwon-si (KR); Bokun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 411 days.

(21) Appl. No.: 17/688,380

(22) Filed: Mar. 7, 2022

(65) Prior Publication Data
US 2022/0248483 A1     Aug. 4, 2022

Related U.S. Application Data

(63) Continuation of application No. PCT/KR2022/001718, filed on Feb. 3, 2022.

(30) Foreign Application Priority Data

Feb. 3, 2021    (KR) ........................ 10-2021-0015527

(51) Int. Cl.
*G06F 3/0484*     (2022.01)
*H04W 4/80*     (2018.01)
(Continued)

(52) U.S. Cl.
CPC .......... *H04W 76/14* (2018.02); *G06F 3/0484* (2013.01); *H04W 4/80* (2018.02); *H04W 8/005* (2013.01)

(58) Field of Classification Search
CPC ....... H04W 76/14; H04W 4/80; H04W 8/005; G06F 3/14; G06F 13/128; H04M 1/72412; H04L 67/75
See application file for complete search history.

(56) References Cited

U.S. PATENT DOCUMENTS 10,028,318 B2    7/2018   Cho et al.
10,042,595 B2    8/2018   Behzadi et al.
(Continued)

FOREIGN PATENT DOCUMENTS

KR    10-2015-0136981 A    12/2015
KR    10-2016-0043443 A    4/2016
(Continued)

OTHER PUBLICATIONS

International Search Report (PCT/ISA/210) issued May 13, 2022 by the International Searching Authority in International Application No. PCT/KR2022/001718.
(Continued)

*Primary Examiner* — Derrick W Ferris
*Assistant Examiner* — Won Jun Choi
(74) *Attorney, Agent, or Firm* — Sughrue Mion, PLLC

(57) ABSTRACT

An electronic device is provided. The electronic device may include a display, a communication circuit, and a processor configured to control the communication circuit to connect with a plurality of external electronic devices through independent communication links to each of the plurality of external electronic devices and, based on identifying that the plurality of external electronic devices belongs to a set of devices, control the display to display a first user interface
(Continued)

including information indicating that the plurality of external electronic devices belongs to the set of devices, based on coupled-device information of at least one external electronic device among the plurality of external electronic devices.

12 Claims, 35 Drawing Sheets

(51) Int. Cl.
*H04W 8/00* (2009.01)
*H04W 76/14* (2018.01)

(56) References Cited

U.S. PATENT DOCUMENTS

| | | | | |
|---|---|---|---|---|
| 10,159,105 | B1* | 12/2018 | Linsky | H04L 69/24 |
| 10,248,399 | B2 | 4/2019 | Yoon | |
| 10,866,706 | B2 | 12/2020 | Keam et al. | |
| 2008/0057890 | A1* | 3/2008 | McKillop | H04L 63/10 |
| | | | | 455/185.1 |
| 2014/0079238 | A1 | 3/2014 | Bastide et al. | |
| 2016/0105924 | A1 | 4/2016 | Baek et al. | |
| 2016/0127938 | A1 | 5/2016 | Yoon et al. | |
| 2016/0360350 | A1* | 12/2016 | Watson | H04R 1/1041 |
| 2017/0094391 | A1* | 3/2017 | Panecki | H04R 9/06 |
| 2017/0311359 | A1 | 10/2017 | Cho et al. | |
| 2018/0067712 | A1* | 3/2018 | Behzadi | G06F 3/14 |
| 2020/0288292 | A1 | 9/2020 | Cheong et al. | |
| 2021/0014610 | A1 | 1/2021 | Carrigan et al. | |
| 2022/0039179 | A1* | 2/2022 | Chen | H04R 1/1016 |
| 2022/0201113 | A1* | 6/2022 | Peng | H04W 52/0245 |

FOREIGN PATENT DOCUMENTS

| | | | | |
|---|---|---|---|---|
| KR | 1020160042569 | A | 4/2016 | |
| KR | 1661577 | B1 * | 10/2016 | H04B 13/005 |
| KR | 10-2019-0021562 | A | 3/2019 | |
| KR | 10-2019-0022883 | A | 3/2019 | |
| KR | 10-2021-0008329 | A | 1/2021 | |
| WO | 2020180042 | A1 | 9/2020 | |

OTHER PUBLICATIONS

Written Opinion (PCT/ISA/237) issued May 13, 2022 by the International Searching Authority in International Application No. PCT/KR2022/001718.

Communication dated Oct. 27, 2025 issued by the Korean Intellectual Property Office in Korean Patent Application No. 10-2021-0015527.

* cited by examiner

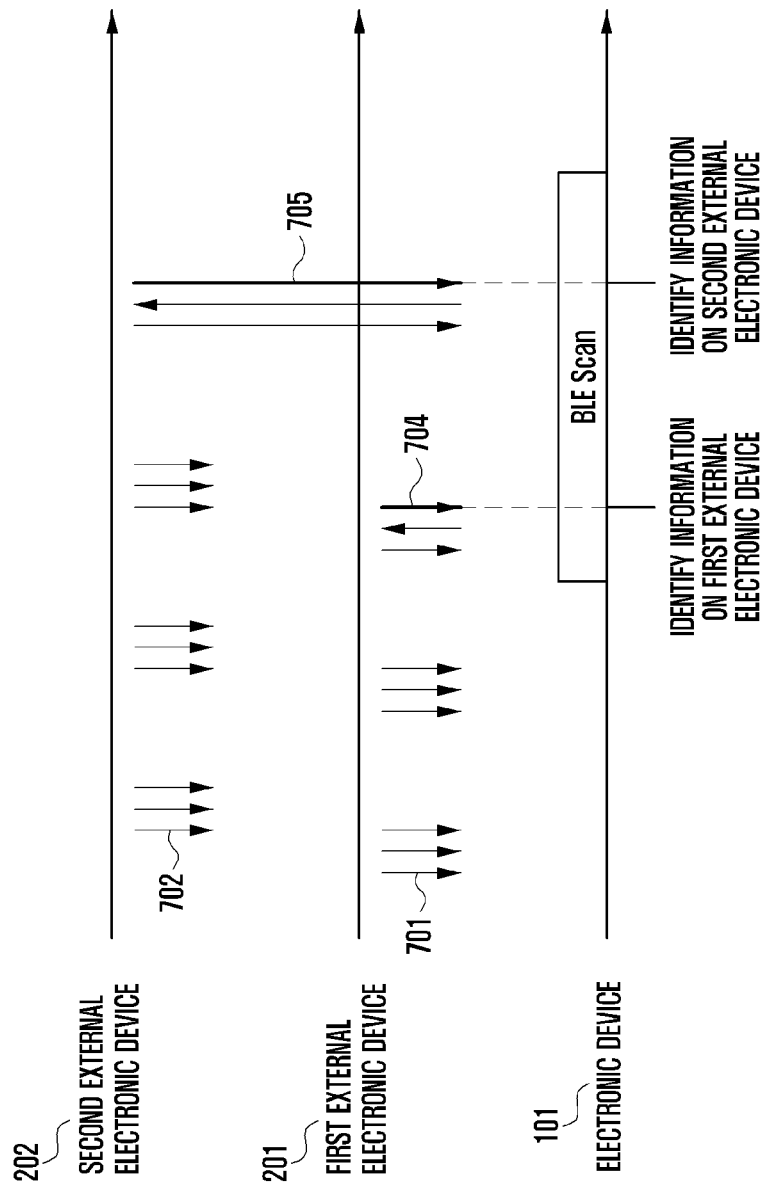

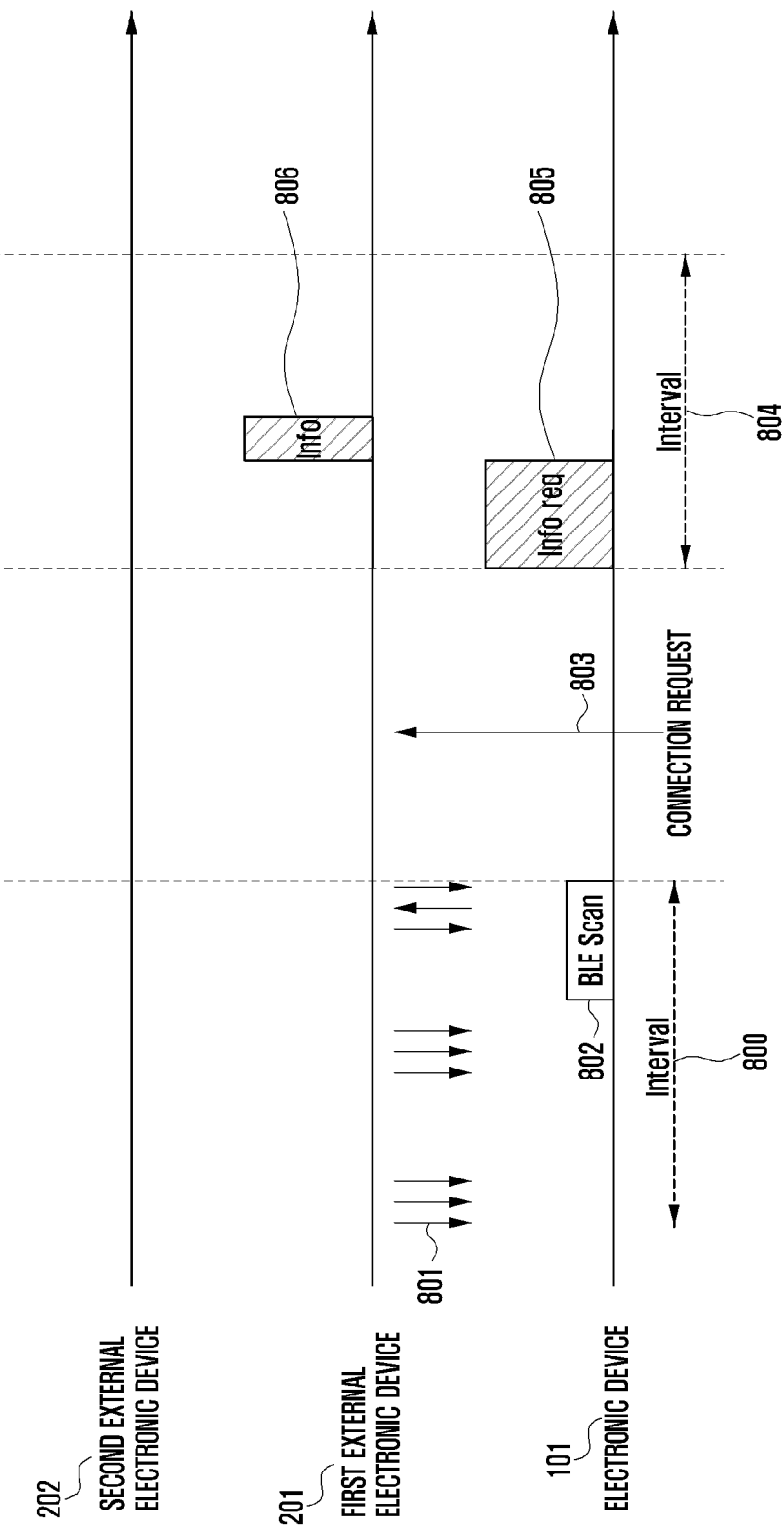

ELECTRONIC DEVICE FOR PROVIDING USER INTERFACE RELATED TO PLURALITY OF EXTERNAL ELECTRONIC DEVICES AND OPERATING METHOD THEREOF

CROSS-REFERENCE TO RELATED APPLICATION(S)

This application is a bypass continuation of International Application No. PCT/KR2022/001718, filed on Feb. 3, 2022, which is based on and claims priority to Korean Patent Application No. 10-2021-0015527, filed on Feb. 3, 2021, in the Korean Patent Office, the disclosures of which are incorporated by reference herein in their entireties.

BACKGROUND

1. Field

The disclosure relates to an electronic device that provides a user interface related to a plurality of external electronic devices and an operating method of the electronic device.

2. Description of Related Art

Various electronic devices such as smartphones, tablet personal computers (PCs), portable multimedia players (PMPs), personal digital assistants (PDAs), laptop PCs, or wearable devices are widespread.

The electronic device may output sound data using a wireless earphone device or a wireless speaker system. The wireless earphone device may include two wireless earphones (e.g., left/right earphones or first/second earphones) that receive sound data from an electronic device and output sound data. A wireless speaker system may include a plurality of (e.g., two or six) wireless speakers to realize stereo or 5.1 channel sound.

The electronic device may be connected to two wireless earphones or a plurality of wireless speakers through wireless communication and receive a variety of information about the two wireless earphones or the plurality of wireless speakers in order to output sound data to the two wireless earphones or the plurality of wireless speakers.

When an electronic device is connected to a plurality of external electronic devices through wireless communication, even in the case where the plurality of external electronic devices is included in a set (e.g., left/right wireless earphones or an audio system including a plurality of wireless speakers), if the respective external electronic devices establish independent communication links with each other, the electronic device may not identify the mutual relationship (e.g., configured as one set) of the plurality of external electronic devices.

According to various embodiments of the present disclosure, in the case where an electronic device is connected to a plurality of external electronic devices through independent communication links with each other, the electronic device may identify that the plurality of external electronic devices are devices included in one set and provide a user interface based thereon.

SUMMARY

Additional aspects will be set forth in part in the description which follows and, in part, will be apparent from the description, or may be learned by practice of the presented embodiments.

In accordance with an aspect of the disclosure, an electronic device may include a display, a communication circuit, and a processor configured to control the communication circuit to connect with a plurality of external electronic devices through independent communication links to each of the plurality of external electronic devices and, based on identifying that the plurality of external electronic devices belongs to a set of devices, control the display to display a first user interface including information indicating that the plurality of external electronic devices belongs to the set of devices, based on coupled-device information of at least one external electronic device among the plurality of external electronic devices.

The processor may be further configured control the display to display role information of the at least one external electronic device on the first user interface based on device attribute information of the at least one external electronic device.

The processor may be further configured to obtain the coupled-device information from the at least one external electronic device through an independent communication link with the at least one external electronic device.

The processor may be further configured to obtain the coupled-device information from a signal received from the at least one external electronic device for establishing the independent communication link with the at least one external electronic device.

The processor may be further configured to control the communication circuit to transmit a request through the independent communication link with the at least one external electronic device, and obtain the coupled-device information from a response signal to the request from the at least one external electronic device.

The processor may be further configured to control the display to display a first menu for integrated control of the plurality of external electronic devices through the first user interface.

The processor may be further configured to control the display to display a second menu for individually controlling the at least one external electronic device through a second user interface.

The processor may be further configured to control the display to display, through the first user interface, a currently connected external electronic device and a currently unconnected external electronic device, among the plurality of external electronic devices.

The processor may be further configured to compare coupled-device information of respective external electronic devices of the plurality of external electronic devices to identify that the plurality of external electronic devices belongs to the set of devices.

The processor may be further configured to store the coupled-device information of the at least one external electronic device in a memory, and based on receiving a communication link connection request from the at least one external electronic device, control the display to display a notification identifying whether to connect with the at least one external electronic device and information indicating that the at least one external electronic device belongs to the set of devices.

In accordance with an aspect of the disclosure, a method of operation an electronic device may include connecting with a plurality of external electronic devices through independent communication links with each of the plurality of external electronic devices, identifying that the plurality of external electronic devices belongs to a set of devices, based on at least one piece of coupled-device information of the plurality of external electronic devices, and based on identifying that the plurality of external electronic devices belongs to the set of devices, displaying, by a display of the electronic device, a first user interface including information indicating that the plurality of external electronic devices belongs to the set of devices.

The displaying the first user interface may include displaying role information of at least one external electronic device in the set of devices on the first user interface, based on device attribute information of the at least one external electronic device.

The method may further include obtaining the at least one piece of coupled-device information from at least one external electronic device through an independent communication link with the at least one external electronic device.

Obtaining the at least one piece of coupled-device information further may include obtaining the at least one piece of coupled-device information from a signal received from the at least one external electronic device for establishing the independent communication link from the at least one external electronic device.

Obtaining the at least one piece of coupled-device information may include transmitting a request through the independent communication link with the at least one external electronic device, and obtaining the at least one piece of coupled-device information from a response signal to the request from the at least one external electronic device.

The display the first user interface may include displaying a first menu for integrated control of the plurality of external electronic devices through the first user interface.

The method may further include displaying a second user interface including a second menu for individually controlling at least one external electronic device.

Providing the first user interface may include displaying, through the first user interface, a currently connected external electronic device and a currently unconnected external electronic device, among the plurality of external electronic devices.

Identifying that the plurality of external electronic devices belongs to the set of devices may include comparing coupled-device information of respective external electronic devices of the plurality of external electronic devices to identify that the plurality of external electronic devices belongs to the set of devices.

The method may further include storing the at least one piece of coupled-device information of at least one external electronic device in a memory of the electronic device, and based on receiving a communication link connection request from the at least one external electronic device, displaying a notification identifying whether to connect with the at least one external electronic device and information indicating that the at least one external electronic device belongs to the set of devices.

According to various embodiments, in the case where a plurality of external electronic devices is connected to an electronic device through independent communication links with each other, the electronic device is able to identify that the plurality of external electronic devices are devices included in one set and provide a user interface based thereon.

According to various embodiments, the electronic device is able to identify that a plurality of external electronic devices is included in one set and provide various user interfaces for integrated control or individual control of the plurality of external electronic devices.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is a diagram illustrating an operation in which an electronic device receives information from a plurality of external electronic devices before a communication link connection according to an embodiment;

FIGS. 8A and 8B are diagrams illustrating an operation in which an electronic device receives information from a plurality of external electronic devices after a communication link connection according to an embodiment;

DETAILED DESCRIPTION

Figure 1:
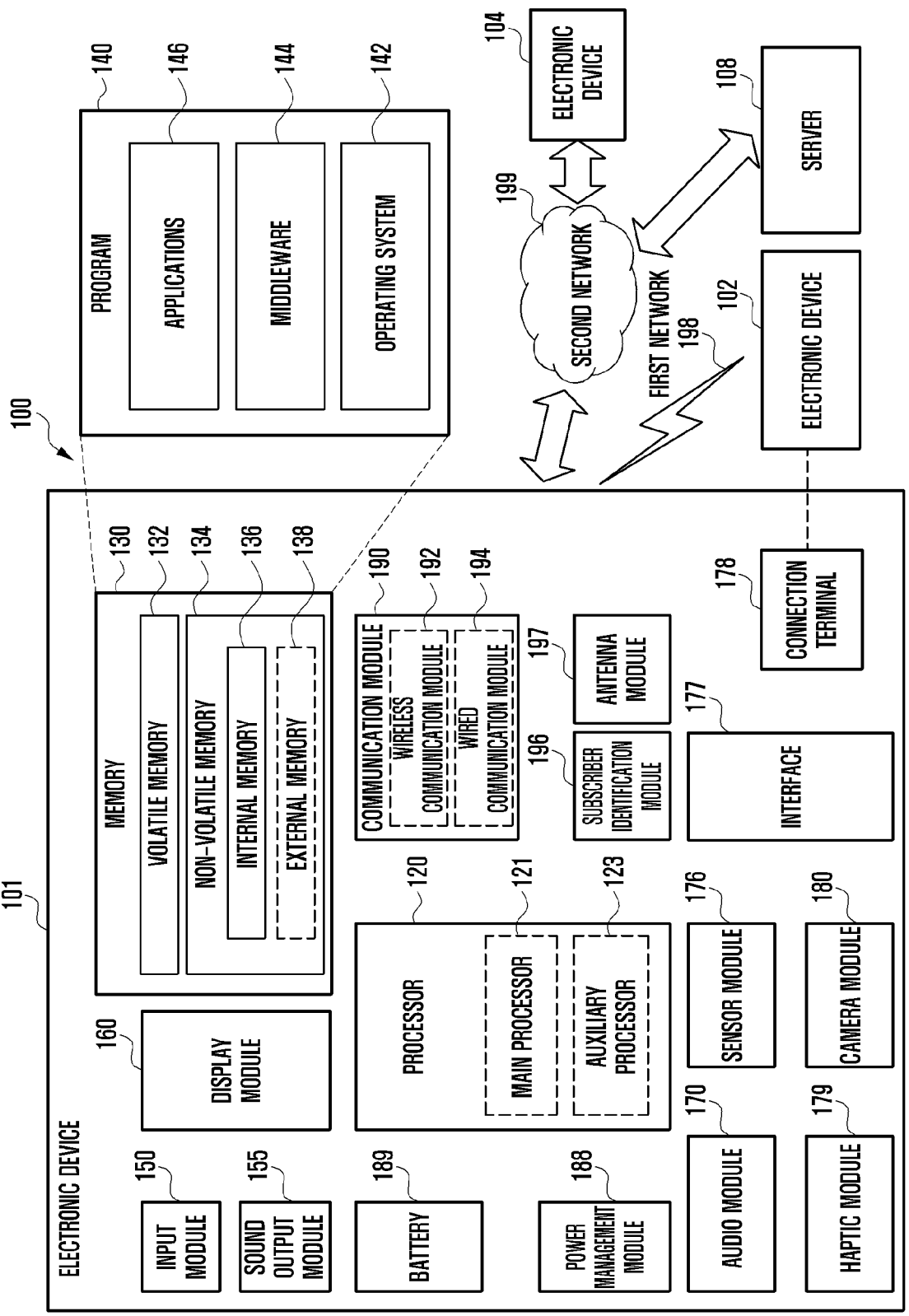
FIG. 1 is a block diagram of an electronic device in a network environment, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
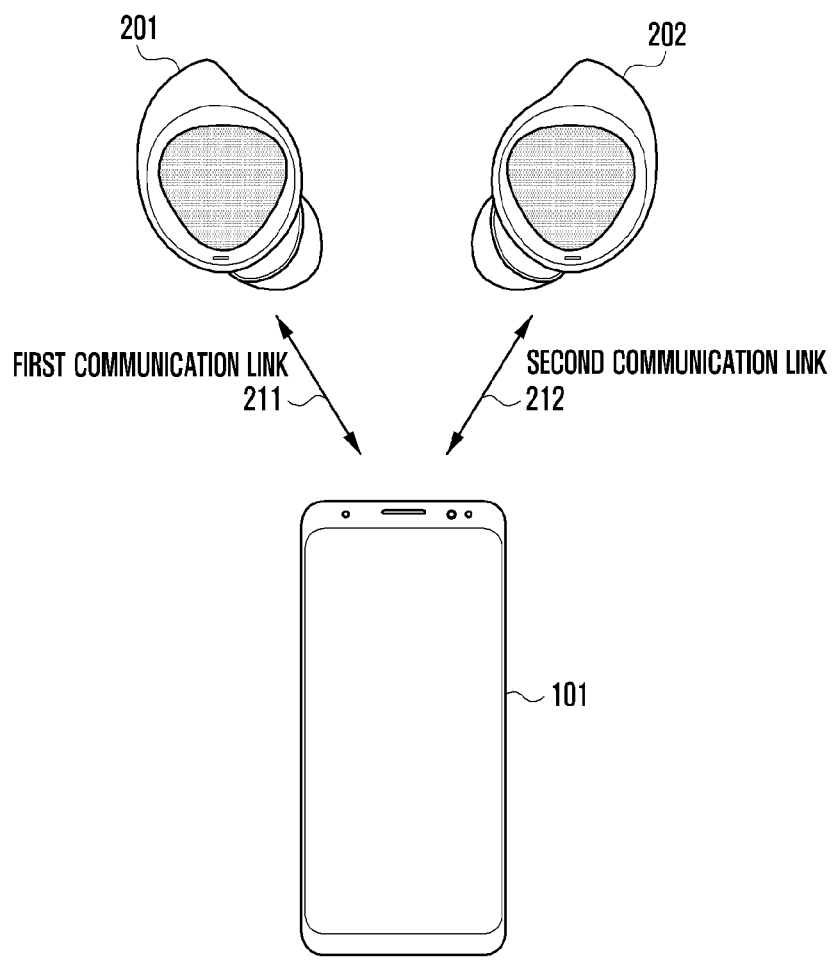
FIG. 2 is a diagram of an electronic device and a plurality of external electronic devices according to an embodiment.

FIG. 2 is a diagram of an electronic device and a plurality of external electronic devices according to an embodiment According to various embodiments, an electronic device (e.g., the electronic device 101 of FIG. 1) may be connected to a plurality of external electronic devices through individual communication links of various communication schemes (e.g., a wireless communication scheme of Bluetooth, Bluetooth low energy (BLE), or Wi-Fi), and may receive data from the connected external electronic devices and process the received data. Although an example in which the electronic device 101 is respectively connected to two external electronic devices will be described below, the disclosure is not limited thereto, and the electronic device may be connected to two or more various external electronic devices, for example, three or six external electronic devices.

According to various embodiments, the plurality of external electronic devices (e.g., the first external electronic device 201 and the second external electronic device 202) may include two or more wireless sound output devices (e.g., the first external electronic device 201 and the second external electronic device 202) that are respectively connected to the electronic device 101 through individual communication links in various communication schemes, receive wireless data (e.g., sound data) from the electronic device 101, and output sound.

According to various embodiments, the plurality of external electronic devices (e.g., the first external electronic device 201 and the second external electronic device 202) may be devices included in one set. For example, the devices included in one set may be devices that are connected through separate communication links and provide related functions to provide one integrated service (e.g., stereo sound output or 5.1 channel sound output). For example, the first external electronic device 201 and the second external electronic device 202 may be wireless earphone devices operating as one set. For example, the first external electronic device 201 may be a left wireless earphone, and the second external electronic device 202 may be a right wireless earphone.

According to various embodiments, the electronic device 101 may be connected to the first external electronic device 201 through a first communication link 211. According to various embodiments, the electronic device 101 may be connected to the second external electronic device 202 through a second communication link 212 that is independent and separate from the first communication link. For example, the electronic device 101 may receive various signals (e.g., an advertising signal) to establish communication links from the first external electronic device 201 and/or the second external electronic device 202 and transmit various signals to the first external electronic device 201 and/or the second external electronic device 202.

According to various embodiments, the electronic device 101 may receive various pieces of information (e.g., coupled-device information and/or device attribute information) from the first electronic device 201 and/or the second electronic device 202, and provide various user interfaces (e.g., a notification or a control interface) through a display (e.g., the display module 160 in FIG. 1), based on the received information.

According to various embodiments, the electronic device 101 may transmit, to the first external electronic device 201 and/or the second external electronic device 202, a variety of data to be provided to the user. For example, the electronic device 101 may transmit, to the first external electronic device 201 and/or the second external electronic device 202, sound data to be provided to the user.

According to various embodiments, the first external electronic device 201 and the second external electronic device 202 may be further connected through a separate third communication link as necessary.

According to various embodiments, in the case where the first external electronic device 201 and the second external electronic device 202 are implemented as wireless earphones, the first external electronic device 201 and/or the second external electronic device 202 may receive a variety of data (e.g., data for synchronization of sound output from the wireless earphones, data for sound adjustment, or a response signal to a signal transmitted from the first electronic device 201 and/or the second electronic device 202) from the electronic device 101.

According to various embodiments, the electronic device 101 may store information related to wireless communication connection with the first external electronic device 201 and the second electronic device 202 in a memory (e.g., the memory 130 in FIG. 1). For example, in the case where the electronic device 101 has a history of performing wireless communication with the first external electronic device 201, the electronic device 101 may store identification information of the first electronic device 201 in the memory 130. For example, the identification information of the first external electronic device 201 may include an address of the first external electronic device 201 (e.g., a Bluetooth device address). For example, in the case where the electronic device 101 has a history of performing wireless communication with the first external electronic device 201 and/or the second external electronic device 202, the electronic device 101 may store coupled-device information and/or device attribute information of the first external electronic device 201 and/or the second external electronic device 202 in the memory 130.

Hereinafter, a description will be made based on an example in which the first communication link 211 and the second communication link 212 are wireless communication channels respectively established according to a BLE communication scheme. However, the first communication link 211 and the second communication link 212 are not limited thereto, and may include wireless communication channels established according to various communication schemes such as Bluetooth, BLE, or Wi-Fi.

Hereinafter, a description will be made based on an example in which the first external electronic device 201 and the second external electronic device 202 among the plurality of external electronic devices are a pair of wireless earphones. However, the plurality of external electronic devices is not limited thereto, and may include a plurality of wireless electronic devices operating as a set, such as a plurality of wireless speakers.

Figure 3:
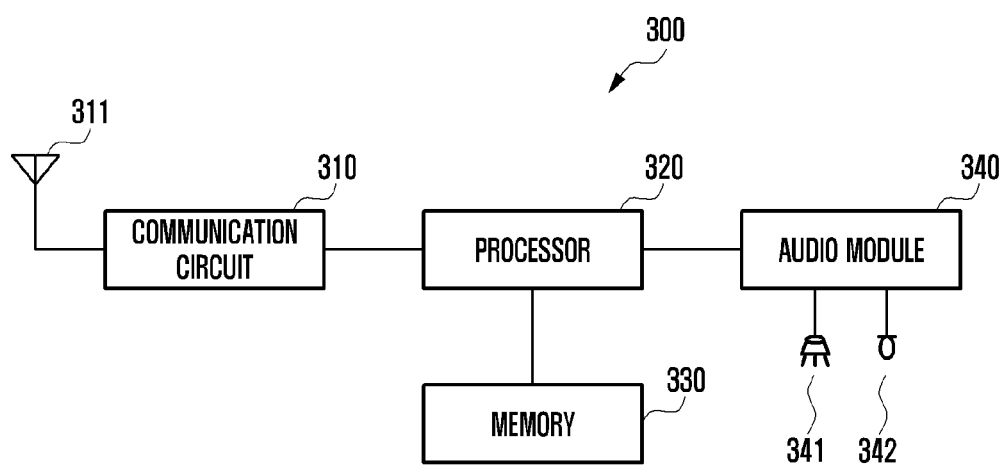
FIG. 3 is a diagram of an external electronic device according to an embodiment.

FIG. 3 is a diagram of an external electronic device according to an embodiment.

According to various embodiments, an external electronic device 300 (e.g., the first external electronic device 201 or the second external electronic device 202 in FIG. 2) may be connected to an electronic device (e.g., the electronic device 101 in FIG. 1) through various communication schemes (e.g., Bluetooth, BLE, or Wi-Fi), receive data from the connected electronic device 101, and process the received data as shown in FIG. 2.

Referring to FIG. 3, the external electronic device 300 may include a communication circuit 310, at least one antenna 311, a processor 320, a memory 330, an audio module 340, a speaker 341, or a microphone 342. According to various embodiments, the external electronic device 300 may exclude at least one of the elements in FIG. 3 or further include one or more other elements. According to various embodiments, some of these elements may be implemented as a single integrated circuit.

The processor 320 may execute, for example, software to control at least one other element (e.g., a hardware or software element) of the external electronic device 300 connected to the processor 320, and may perform processing a variety of data or operation thereof. According to an embodiment, as at least part of data processing or operation, the processor 320 may load a command or data received from another element (e.g., the sensor module 350 or the communication circuit 310) into a volatile memory of the memory 330, process commands or data stored in the volatile memory, and store resulting data thereof in a nonvolatile memory.

The memory 330 may store, for example, a variety of data used by at least one element (e.g., the processor 320 or the sensor module 350) of the external electronic device 300. The data may include, for example, software (e.g., programs) and input data or output data for instructions related thereto. The memory 330 may include a volatile memory or a nonvolatile memory. The programs may be stored as software in the memory 330 and include, for example, an operating system, middleware, or applications. The memory 330 may store, for example, instructions related to various operations performed by the processor 320.

The audio module 340 may convert a sound into an electric signal or, conversely, convert an electric signal into a sound. The speaker 341 may output, for example, an audio signal to the outside of the external electronic device 300. Sound waves such as sound or voice may be input to the microphone 342 through a microphone hole, and the microphone 342 may generate an electrical signal therefor.

The audio module 340 may obtain a sound through the microphone 342 or output a sound through the speaker 341. For example, the audio module 340 may include an audio decoder, a digital-to-analog (D/A) converter, or an analog-to-digital (A/D) converter. The audio decoder may convert audio data stored in the memory 330 into digital audio signals. The D/A converter may convert the digital audio signal converted by the audio decoder into an analog audio signal. The speaker 341 may output the analog audio signal converted by the D/A converter. The A/D converter may convert an analog audio signal obtained through the microphone 342 into a digital audio signal.

According to various embodiments, the communication circuit 310 may support, for example, establishment of a wired communication channel or wireless communication channel between the external electronic device 300 and the electronic device (e.g., the electronic device 101 in FIG. 1), and communication through the established communication channel. According to various embodiments, the communication circuit 310 may operate independently of the processor 320 and include one or more communication processors supporting wired communication or wireless communication.

The communication circuit 310 may transmit or receive a signal to or from the electronic device 101 through, for example, at least one antenna (or antenna radiator) 311. According to various embodiments, the communication circuit 310 may include a wireless communication module (e.g., a short-range wireless communication module or a global navigation satellite system (GNSS) communication module) or a wired communication module (e.g., a LAN communication module or a power line communication module). A corresponding communication module among these communication modules may communicate with the electronic device 101 through a first network (e.g., a short-range communication network such as such as Bluetooth, BLE, near field communication (NFC), ultra-wide band (UWB), WiFi direct, or IrDA) or a second network (e.g., a long-range communication network such as the Internet or a computer network (e.g., LAN or WAN)). Various types of the communication modules may be integrated into one element (e.g., a single chip) or may be implemented as a plurality of elements separated from each other (e.g., multiple chips). According to various embodiments, the external electronic device 300 may include a plurality of antennas 311, and the communication circuit 310 may select at least one antenna suitable for a communication scheme used in a communication network from the plurality of antennas 311. A signal or power may be transmitted or received between the communication circuit 310 and the electronic device 101 through at least one selected antenna.

According to an embodiment, all or some of operations executed in the external electronic device 300 may be executed in the electronic device 101. For example, when the external electronic device 300 is to perform a function or service automatically or in response to a request from a user or another device, the external electronic device 300 may further request the electronic device 101 to perform at least a portion of the function or service, instead of executing the function or service by itself. Upon receiving the request, the electronic device 101 may execute at least a portion of the requested function or service or an additional function or service related to the request, and transmit an execution result thereof to the external electronic device 300. The external electronic device 300 may provide, as at least a portion of a response to the request, the result as it is or by further processing the same According to various embodiments, the command or data received by the processor 320 may be transmitted or received between the external electronic device 300 and the electronic device 101 through a server (e.g., the server 108 in FIG. 1) connected to the second network (e.g., a long-range communication network such as the Internet or a computer network (e.g., LAN or WAN)).

According to various embodiments, the processor 320 may be configured to control various signal flows related to audio data and control information collection and output. The processor 320 may be configured to receive audio data from the electronic device 101 through the communication circuit 310 and store the received audio data in the memory 330. For example, the processor 320 may be configured to receive nonvolatile audio data (or downloaded audio data) from the electronic device 101 and store the received nonvolatile audio data in the nonvolatile memory 330. For example, the processor 320 may be configured to receive volatile audio data (or streaming audio data) from the electronic device 101 and store the received volatile audio data in the volatile memory 330.

According to various embodiments, the processor 320 may be configured to reproduce audio data (e.g., nonvolatile audio data or volatile audio data) stored in the memory 330 and output the same through the speaker 341. For example, the audio module 340 may generate an audio signal capable of being output through the speaker 341 by decoding the audio data (e.g., reproduction of audio data), and the generated audio signal may be output through the speaker 341.

According to various embodiments, the external electronic device 300 may further include various modules depending on the provided form thereof. Although variations in line with the convergence trend of digital devices are too many to enumerate them all, elements equivalent to the above-mentioned elements may be further included in the external electronic device 300. In addition, the external electronic device 300 according to an embodiment may exclude specific elements from the above elements or replace them with other elements depending on the provided form thereof as will be understood by one of ordinary skill in the art.

According to various embodiments, the communication circuit 310 may transmit or receive data to or from the electronic device 101 through wireless communication. For example, the communication circuit 310 may support wireless communication (e.g., Bluetooth, BLE, or Wi-Fi) capable of being supported by the electronic device 101, and perform various operations (e.g., outputting an advertising signal, outputting a paging signal, establishing a wireless communication channel, or releasing a wireless communication channel) using the supported wireless communication.

According to various embodiments, the memory 330 may store data received through the communication circuit 310, information stored in the process of manufacturing the external electronic device 300, or data input later through update or setting change through a server (e.g., the server 108 in FIG. 1) or a specified device.

For example, the memory 330 may store information for wireless communication connection between the external electronic device 300 and the electronic device 101. For example, in the case where the external electronic device 300 is a device included in a pair or one set (hereinafter referred to as one set), the memory 330 may store coupled-device information including information indicating that it is a set device. For example, the coupled-device information may include the same information stored by the external electronic device 300 and other external electronic devices included in one set. For example, the coupled-device information may include some of attribute information or identification information of the external electronic device 300 and other external electronic devices included in one set. For example, the coupled-device information may include information on at least one other external electronic device included in one set. For example, the coupled-device information may include a synchronization ID (synced ID) (e.g., 0x01 08 84 72 55 4F) and/or a coupled-device ID (e.g. 0x01 08 84 72 55 4F), among attribute information of the external electronic device 300 in an example shown in Table 1.

TABLE 1

| Byte | Item | Contents | Example |
| --- | --- | --- | --- |
| 0 | Version | SW version | 0x07 |
| 1 | Device Capabilities | Mono/Stereo/Surround Channels | Refer to Device Capabilities |
| 3~10 | Synced ID | 0~1 Vendor ID/2~9 Synced ID | 0x01 08 84 72 55 4F |
| 11~16 | Coupled-device ID | Coupled-device ID | 0x01 08 84 72 55 4F |
| 17 | Feature Map | BIS/BIG/CIS | 0000 0111 |
| 18~19 | Render Delay | Latency to Audio output | 0x01 2C (300 ms) |

TABLE 1-continued

| Byte | Item | Contents | Example |
| --- | --- | --- | --- |
| 20~23 | User security info | Password to manage Items | 0x19 79 02 06 |
| 24~25 | Supported Codec | G.722/LC3/Vendor specific codec ID | 0000 0000 0000 0011 |

For example, the coupled-device information may be input and stored in a process step while manufacturing the external electronic device 300, may be changed by updating through a server (e.g., server 108 in FIG. 1) or setting in a service center later, may be configured and input by coupling with another external electronic device through the electronic device 101, may be input through a device (not shown) capable of supplying power to the external electronic device 300, or may be input through another external electronic device included in the same set.

For example, in the case where the external electronic device 300 is a device included in one set, the memory 330 may store device attribute information including information indicating a function or role of the external electronic device 300 in one set.

TABLE 2

| Byte | Item | Contents | Example |
| --- | --- | --- | --- |
| 0 | Mono | Mono | 0 (left) |
| 1 | Binaural | Stereo | 1 (Binaural) |
| 2 | 5.1 channel (CH) | 5.1CH Surround | 0 (Not supported) |
| 3 | Front Right (FR) | | 0 |
| 4 | Front Left (FL) | | 0 |
| 5 | Center (C) | | 0 |
| 6 | Rear Left (RL) | | 0 |
| 7 | Rear Right (RR) | | 0 |
| 8~15 | Subwoofer (SW) reserved for future | | 0 |

For example, in the case where a plurality of external electronic devices (e.g., the first external electronic device 201 and the second external electronic device 202) included in one set including the external electronic device 300 is implemented as a plurality of wireless earphones, device attribute information (device capabilities) including information on whether each wireless earphone is a left wireless earphone or a right wireless earphone may be stored in the memory 330 in the manufacturing process.

For example, the device attribute information of the external electronic device 300 may be changed after manufacturing the device. For example, when a request for initiating a voice service is received from the electronic device 101, the external electronic device 300 may change channel role information among the device attribute information to mono and store the same. For example, when a request for initiating a media service is received from the electronic device 101, the external electronic device 300 may change channel role information among the device attribute information to stereo left/right and store the same. For example, the channel role information among the device attribute information of the external electronic device 300 may be changed based on the type of audio data received from the electronic device 101.

For example, in the case where a plurality of external electronic devices included in one set (e.g., a stereo or 5.1-channel audio system) including the external electronic device 300 is implemented as a plurality of wireless speakers, each external electronic device may store the coupled-device information and the device attribute information described above. For example, the device attribute information of each external electronic device may include and store function or role information (e.g., a left speaker, a right speaker, or a woofer) of each external electronic device in the audio system. For example, the coupled-device information and device attribute information of the external electronic device 300 may be configured through the electronic device 101 and transmitted to the external electronic device 300 so that the external electronic device 300 may store the received information in a memory (e.g., the memory 330).

For example, the memory 330 may store a variety of information for supporting communication of the external electronic device 300 with the electronic device 101. For example, the memory 330 may store device identification information or address information of the external electronic device 300. For example, the memory 330 may store address information of the electronic device 101 required for a communication connection between the external electronic device 300 and the electronic device 101. For example, the address information of the electronic device 101 may include at least one of identification information, an internet protocol (IP) address, a media access control (MAC) address, and a Bluetooth address of the electronic device 101. For example, the memory 330 may store at least one of device identification information, an IP address, an MAC address, or a Bluetooth address of another external electronic device included in one set together with the external electronic device 300.

According to various embodiments, the processor 320 may transmit, to the electronic device 101, a message including information on the external electronic device 300 in the process of requesting a wireless connection (e.g., establishing a wireless communication channel) with the electronic device 101, in the process of establishing a wireless channel, or after establishing a wireless channel.

According to various embodiments, the message including information of the external electronic device 300 may include a preamble indicating the start of data transmission, a header of data, and data. The header of data may include the type of header, a parity bit for verifying whether the header has an error, and a start bit indicating the start of data. The data may include a data message including information of the external electronic device 300, a parity bit for verifying whether data has an error, a checksum for verifying data integrity, and/or a stop bit indicating the end of data.

According to various embodiments, the electronic device 101 may broadcast a signal (e.g., an advertising signal) including identification information of the external electronic device 300 through various communication schemes (e.g., NFC, Bluetooth, BLE, or PLC communication).

Although the elements (e.g., the communication circuit 310, the processor 320, the memory 330, and/or the charging circuit 340) and the embodiment shown in FIG. 3 have been described in relation to the external electronic device 300, they may be equally applied to the second external electronic device 202 as well as the first external electronic device 201 in FIG. 2.

According to various embodiments, an electronic device (e.g., the electronic device 101 in FIG. 1 or 2) may include a memory (e.g., the memory 130 in FIG. 1), a display (e.g., the display module 160 in FIG. 1), a communication module (e.g., the communication module 190 in FIG. 1), and a processor (e.g., the processor 120 in FIG. 1) electrically connected to the memory 130, the display 160, and the communication module 190.

According to various embodiments, the processor 120 may be configured to control the communication module 190 to connect with a plurality of external electronic devices (e.g., the external electronic devices 201 and/or 202 in FIG. 2 and/or the external electronic device 300 in FIG. 3) through independent communication links with each other, and, based on identifying that the plurality of external electronic devices 201, 202, and/or 300 belongs to a set of devices, based on coupled-device information of at least one external electronic device among the plurality of external electronic devices 201, 202, and/or 300, provide, through the display 160, a user interface including information indicating that the plurality of external electronic devices 201, 202, and/or 300 belongs to the set of devices.

According to various embodiments, the processor 120 may be configured to display role information of the at least one external electronic device 201, 202, and/or 300 in the set of devices on the user interface, based on device attribute information of the at least one external electronic device 201, 202, and/or 300.

According to various embodiments, the processor 120 may be configured to obtain the coupled-device information from the at least one external electronic device 201, 202, and/or 300 through the communication link with the at least one external electronic device 201, 202, and/or 300.

According to various embodiments, the processor 120 may be configured to obtain the coupled-device information from a signal received for establishing the communication link from the at least one external electronic device 201, 202, and/or 300.

According to various embodiments, the processor 120 may be configured to transmit a request through the communication link connected to the at least one external electronic device 201, 202, and/or 300 and obtain the coupled-device information from a response signal to the request from the at least one external electronic device 201, 202, and/or 300.

According to various embodiments, the processor 120 may be configured to provide a menu for integrated control of the plurality of external electronic devices 201, 202, and/or 300 as the set of devices through the user interface.

According to various embodiments, the processor 120 may be configured to provide a menu for individually controlling the at least one external electronic device 201, 202, and/or 300 through another user interface.

According to various embodiments, the processor 120 may be configured to display, through the user interface, a currently connected external electronic device (e.g., the external electronic device 201 in FIG. 2) and a currently unconnected external electronic device (e.g., the external electronic device 202 in FIG. 2) to be distinguished from each other, among the plurality of external electronic devices 201, 202, and/or 300.

According to various embodiments, the processor 120 may be configured to compare coupled-device information of respective ones of the plurality of external electronic devices 201, 202, and/or 300 to identify that the plurality of external electronic devices 201, 202, and/or 300 belongs to the set of devices.

According to various embodiments, the processor 120 may be configured to store the coupled-device information of the at least one external electronic device 201, 202, and/or 300 in the memory 130, and upon receiving a communication link connection request from the at least one external electronic device 201, 202, and/or 300, provide a notification to identify whether or not to connect with the at least one external electronic device 201, 202, and/or 300 together with information indicating that the at least one external electronic device 201, 202, and/or 300 belongs to the set of devices.

Figure 4:
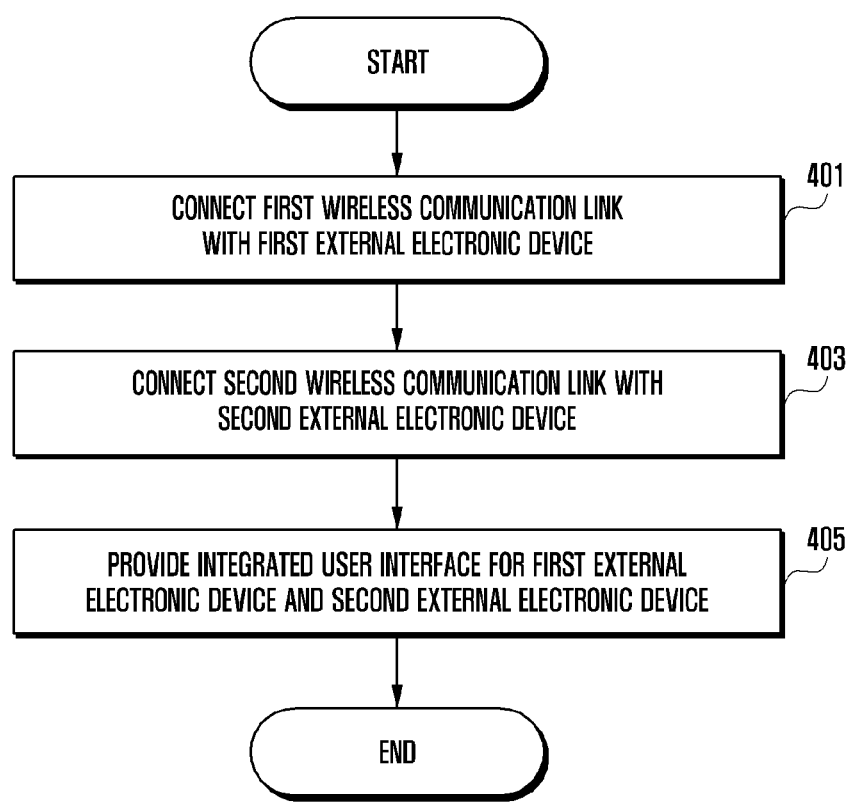
FIG. 4 is a flowchart illustrating the operation of an electronic device according to an embodiment.

FIG. 4 is a flowchart illustrating the operation of an electronic device according to an embodiment. Hereinafter, the operation of an electronic device (e.g., the electronic device 101 in FIG. 1) according to various embodiments will be described with reference to FIGS. 1 to 4.

According to various embodiments, the electronic device 101 may be connected to a plurality of external electronic devices (e.g., the first external electronic device 201 and the second external electronic device 202 in FIG. 2) through communication links in various communication schemes (e.g., a wireless communication scheme of Bluetooth, BLE or Wi-Fi), and may receive data from the connected external electronic device and process the received data. Hereinafter, although an example in which the electronic device 101 is connected to the first external electronic device 201 and the second external electronic device 202, respectively, as shown in FIG. 2, will be described, the disclosure is not limited thereto, and the electronic device may be connected to two or more various external electronic devices, for example, three or six external electronic devices.

According to various embodiments, in operation 401, the electronic device 101 may connect the first external electronic device 201 and a wireless communication link (e.g., the first communication link 211 in FIG. 2).

Figure 5:
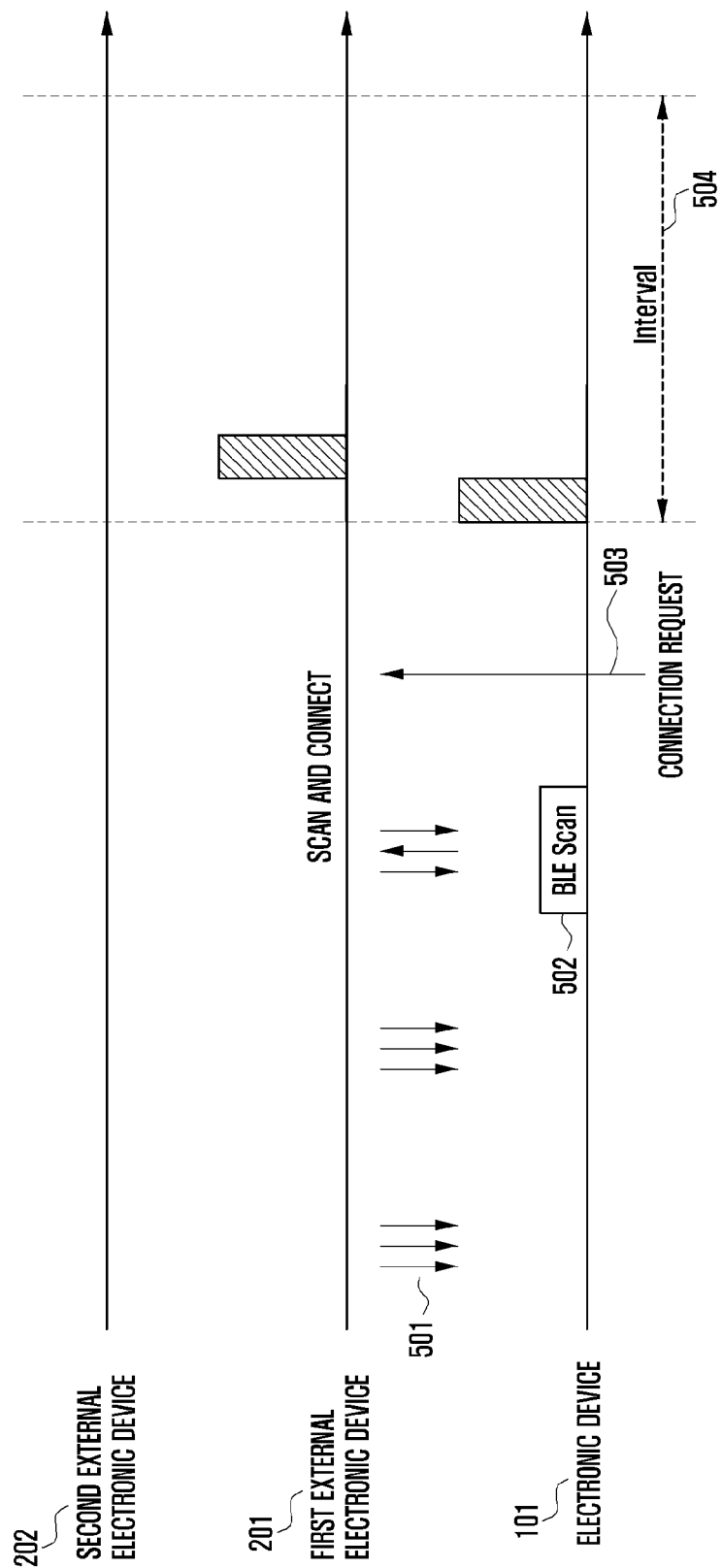
FIG. 5 is a diagram illustrating an operation in which an electronic device and a first external electronic device are connected through a first communication link according to an embodiment.

FIG. 5 is a diagram illustrating an operation in which an electronic device 101 and a first external electronic device 201 establish a first communication link 211 according to an embodiment.

Referring to FIG. 5, the first external electronic device 201 may broadcast a signal 501 (e.g., an advertising signal) including identification information of the first external electronic device 201. For example, the advertising signal may include at least one of identification information (e.g., device identification information) of the first external electronic device 201, user account information, information on whether or not it is currently paired with another device (hereinafter referred to as current pairing information), a list of previously paired devices (hereinafter referred to as a pairing list), information on devices capable of being simultaneously paired (hereinafter referred to as simultaneous pairing information), transmission signal strength (Tx power), signal detection range (e.g., about −70 to about −80 dBm), information about the remaining battery level (hereinafter referred to as battery status information), and/or device attribute information (e.g., left/right audio channel role information). For example, the advertising signal may be transmitted in a multicast method or a broadcasting method to an unspecified peripheral device to establish a wireless communication channel in various schemes (e.g., a BLE scheme).

According to various embodiments, the first external electronic device 201 may produce an advertising signal depending on a specified condition. For example, the first external electronic device 201 may output an advertising signal according to at least one condition of a specified time period or a user input when it is turned on.

According to various embodiments, the electronic device 101 may perform a BLE scan 502 to search for a peripheral external electronic device and receive an advertising signal transmitted by the first external electronic device 201.

According to various embodiments, the electronic device 101 may transmit a connection request signal 503 to the first external electronic device 201, based on the advertising signal received from the first external electronic device 201. For example, the connection request signal 503 may include a variety of information such as device identification information, address information, or clock information of the electronic device 101.

According to various embodiments, when a first communication link with the first external electronic device 201 is established according to the transmission of the connection request signal 503, the electronic device 101 may transmit or receive signals to or from the first external electronic device 201 within a specified channel interval 504.

According to various embodiments, upon receiving the advertising signal, the electronic device 101 may provide a user interface for identifying a connection. For example, the electronic device 101 may output a user interface according to various conditions, based on the information included in the advertising signal. The user interface provided by the electronic device 101 will be described later in detail with reference to, for example, FIGS. 15 to 17C.

According to various embodiments, in operation 403, the electronic device 101 may connect the second external electronic device 202 and a wireless communication link (e.g., the second communication link 212 in FIG. 2).

Figure 6:
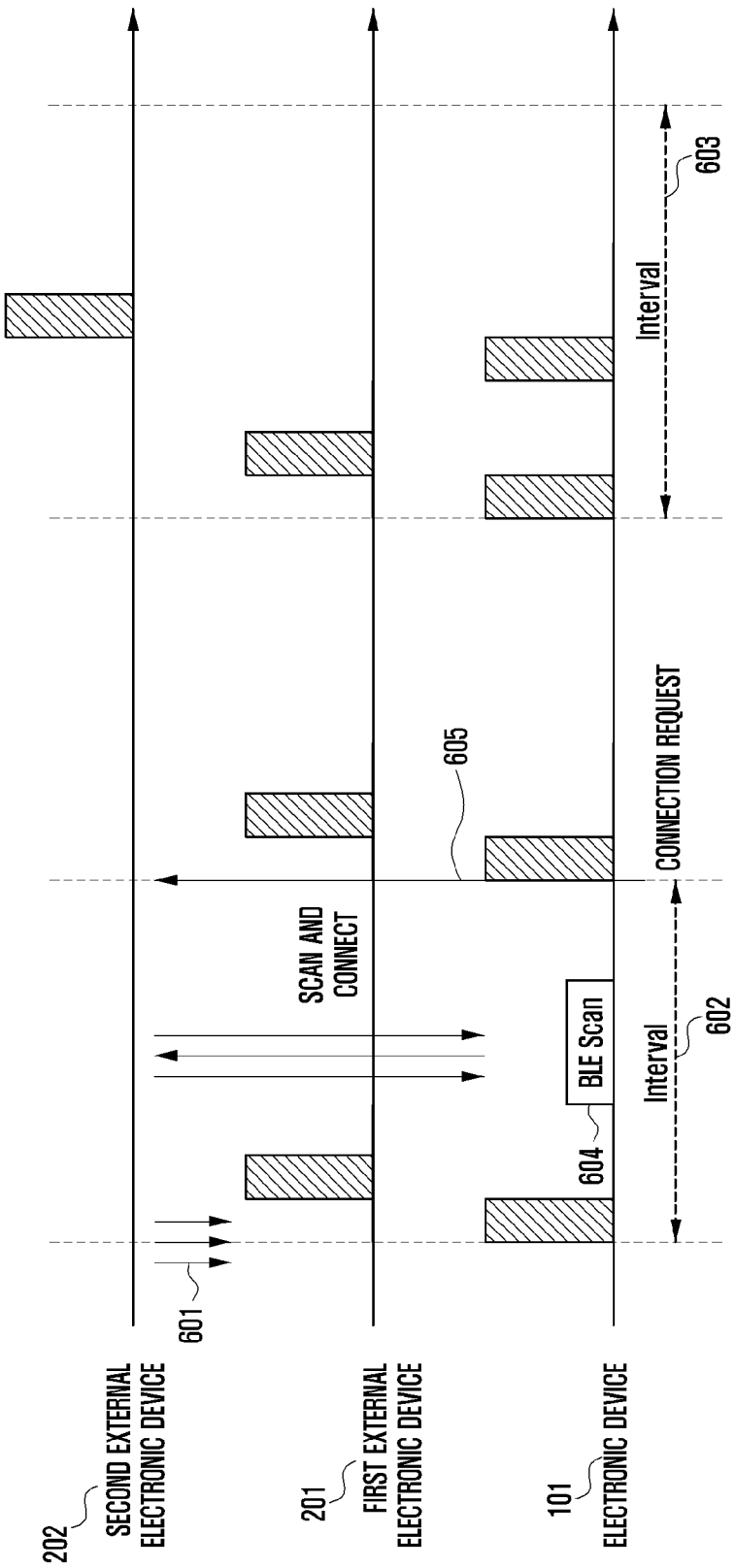
FIG. 6 is a diagram illustrating an operation in which an electronic device and a second external electronic device are connected through a second communication link according to an embodiment.

FIG. 6 is a diagram illustrating an operation in which an electronic device 101 and a second external electronic device 202 establish a second communication link 212 according to an embodiment.

Referring to FIG. 6, the second external electronic device 202 may broadcast a signal 601 (e.g., an advertising signal) including identification information of the second external electronic device 202. For example, the advertising signal may include at least one of identification information (e.g., device identification information) of the second external electronic device 202, user account information, current pairing information, a pairing list, simultaneous pairing information, Tx power, signal detection range, battery status information, and/or device attribute information (e.g., left/right audio channel role information). For example, the advertising signal may be transmitted in a multicast method or a broadcasting method to an unspecified peripheral device to establish a wireless communication channel in various schemes (e.g., a BLE scheme).

According to various embodiments, the second external electronic device 202 may produce an advertising signal depending on a specified condition. For example, the second external electronic device 202 may output an advertising signal according to at least one condition of a specified time period or a user input when it is turned on.

According to various embodiments, the electronic device 101 may be connected to the first external electronic device 201 through a first communication link, and may transmit or receive signals to or from the first external electronic device 201 within a specified channel interval 602.

According to various embodiments, the electronic device 101 may perform, for example, a BLE scan 604 to search for a peripheral external electronic device within the specified channel interval 602, and receive an advertising signal transmitted by the second external electronic device 202.

According to various embodiments, the electronic device 101 may transmit a connection request signal 605 to the second external electronic device 202, based on the advertising signal received from the second external electronic device 202. For example, the connection request signal 605 may include a variety of information such as device identification information, address information, or clock information of the electronic device 101.

According to various embodiments, when the second communication link with the second external electronic device 202 is established according to the transmission of the connection request signal 605, the electronic device 101 may transmit or receive signals to or from the first external electronic device 201 through an allocated channel interval 603.

According to various embodiments, upon receiving an advertising signal, the electronic device 101 may provide a user interface for identifying a connection. For example, the electronic device 101 may output a user interface according to various conditions, based on the information included in the advertising signal. The user interface provided by the electronic device 101 according to various conditions will be described later in detail with reference to, for example, FIGS. 15 to 17C.

According to various embodiments, based on the electronic device 101 recognizing that the first external electronic device 201 and the second external electronic device 202 are a set of devices, the electronic device 101 may provide an integrated user interface for the first external electronic device 201 and the second external electronic device 202 in operation 405. For example, the electronic device 101 may recognize that the first external electronic device 201 and the second external electronic device 202 are a set of devices, based on coupled-device information received from the first external electronic device 201 or the second external electronic device 202. For example, the electronic device 101 may compare the coupled-device information received from the first external electronic device 201 with the coupled-device information received from the second external electronic device 202 to recognize that the first external electronic device 201 and the second external electronic device 202 are devices included in a set of devices.

According to various embodiments, the coupled-device information may include identification information on another electronic device included in one set. For example, when the electronic device 101 receives identification information (e.g., a Bluetooth address and/or device identification information) of another electronic device included in one set (e.g., identification information of the second external electronic device 202 and/or first external electronic device 201) from the first external electronic device 201 and/or the second external electronic device 202, the electronic device 101 may identify that the first external electronic device 201 and the second external electronic device 202 are a set of devices (coupled devices).

According to various embodiments, referring back to Table 1 above, the coupled-device information may include common identification information such as a synchronization ID (synced ID) and/or a coupled-device ID of each of the external electronic devices included in one set. For example, if synchronization IDs and/or coupled-device IDs, received from the first external electronic device 201 and the second external electronic device 202, are the same, the electronic device 101 may identify that the first external electronic device 201 and the second external electronic device 202 are a set of devices. For example, if the electronic device 101 receives a synced ID "01:08:84:72:55:4F" in Table 1 from the first external electronic device 201 and receives the same synced ID "01:08:84:72:55:4F" as that of the first external electronic device 201 from the second external electronic device 202, the electronic device 101 may identify that the first external electronic device 201 and the second external electronic device 202 are a set of devices (coupled devices). For example, if synced IDs and/or coupled-device IDs, received from the first external electronic device 201 and the second external electronic device 202, are different from each other, the electronic device 101 may identify that the first external electronic device 201 and the second external electronic device 202 are not a set of devices (coupled devices). For example, if the electronic device 101 receives a coupled-device ID "Null" from the first external electronic device 201 or the second external electronic device 202, the electronic device 101 may identify that the first external electronic device 201 and the second external electronic device 202 are not a set of devices (coupled devices). For example, if a synced ID and a coupled-device ID received from the first external electronic device 201 are "01:08:84:72:55:4F", whereas if a synced ID and a coupled-device ID received from the second external electronic device 202 are "Null", the electronic device 101 may identify that the first external electronic device 201 and the second external electronic device 202 are not a set of devices (coupled devices).

According to various embodiments, in the case where the electronic device 101 identifies that the first external electronic device 201 and the second external electronic device 202 are a set of devices as wireless communication connection is performed, the electronic device 101 may store coupled-device information of the first external electronic device 201 and the second external electronic device 202 together with related information (e.g., device identification information and address information) for supporting communication link connection.

According to various embodiments, the electronic device 101 may store, in the memory 130, the coupled-device information of the first external electronic device 201 and the second external electronic device 202 together with information (e.g., device identification information and/or address information) for communication link connection according to user configuration.

For example, in the case where the coupled-device information of the first external electronic device 201 and the second external electronic device 202 is stored in the electronic device 101 together with the related information for communication link connection, the electronic device 101 may immediately identify that each external electronic device belongs to a set of devices when the communication link with the first external electronic device 201 or the second external electronic device 202 is established.

According to various embodiments, the electronic device 101 may identify the respective external electronic devices from the set of devices, based on device attribute information of the first external electronic device 201 and the second external electronic device 202. For example, the device attribute information may include a function or role (e.g., an audio channel role) of each of the external electronic devices in the set of devices.

For example, in the case where the first external electronic device 201 and the second external electronic device 202 included in one set are implemented as a plurality of wireless earphones, the first external electronic device 201 and the second external electronic device 202 may transmit device attribute information (device capabilities) including information on whether the device is a left wireless earphone or a right wireless earphone to the electronic device 101.

For example, when the electronic device 101 transmits a voice service initiation request to the first external electronic device 201 and/or the second external electronic device 202, the electronic device 101 may receive device attribute information in which channel role information is specified as mono, among the device attribute information, from the first external electronic device 201 or the second external electronic device 202. For example, when the electronic device 101 transmits a media service initiation request to the first external electronic device 201 and the second external electronic device 202, the electronic device 101 may receive device attribute information in which channel role information is specified as left/right stereo, among the device attribute information, from each of the first external electronic device 201 and the second external electronic device 202.

For example, in the case where a set of devices including a plurality of external electronic devices is implemented as an audio system including a plurality of wireless speakers (e.g., a stereo or 5.1-channel audio system), the electronic device 101 may receive coupled-device information and device attribute information from the respective external electronic devices.

According to various embodiments, the electronic device 101 may receive a signal including coupled-device information and/or device attribute information from the first external electronic device 201 and/or the second external electronic device 202 before the communication link connection, at the time of establishing the communication link, at a specific time after establishing the same, or at the time of re-establishing the link.

According to various embodiments, the first external electronic device 201 and/or the second external electronic device 202 may include the coupled-device information and the device attribute information in the same signal and transmit the same to the electronic device 101, or may include the same in different signals and transmit the signals at different times.

FIG. 7 is a diagram illustrating an operation in which an electronic device 101 receives coupled-device information and/or device attribute information from a first external electronic device 201 and/or a second external electronic device 202 before communication link connection according to an embodiment.

According to various embodiments, the electronic device 101 may obtain coupled-device information and/or device attribute information from, for example, packets of an advertising signal 701 and/or 702 or a scan response signal 704 and/or 705 received from the first external electronic device 201 and/or the second external electronic device 202 before communication link connection.

According to various embodiments, for example, the packets of an advertising signal 701 and/or 702 or a scan response signal 704 and/or 705 received from the first external electronic device 201 and/or the second external electronic device 202 before communication link connection may include coupled-device information and/or device attribute information of the first external electronic device 201 and/or the second external electronic device 202. For example, the packet of the advertising signal 701 and/or 702 or the scan response signal 704 and/or 705 may include both coupled-device information and device attribute information, but may include any one piece (e.g., the coupled-device information) of the coupled-device information of the device attribute information.

Figure 8B:
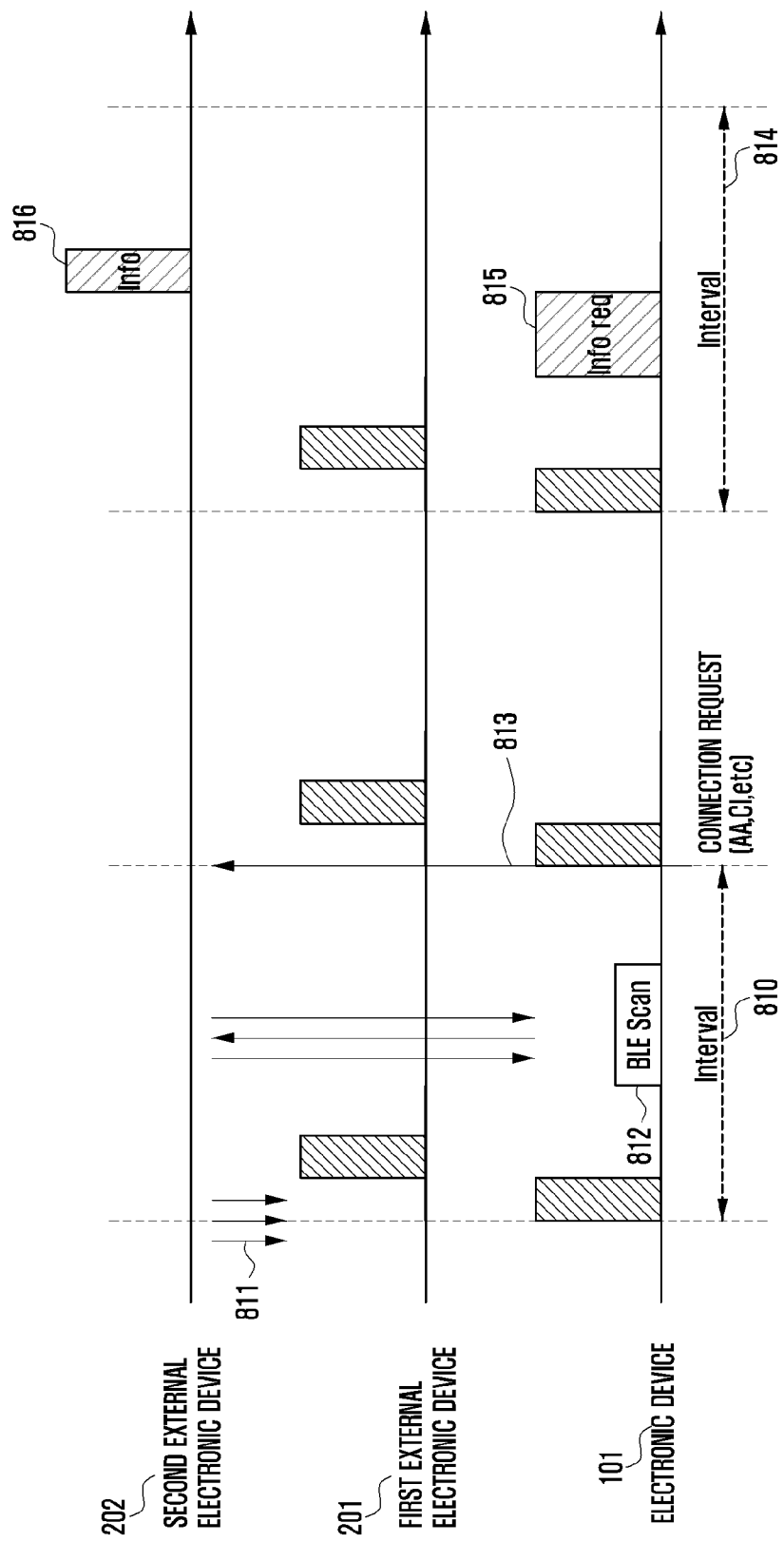

FIGS. 8A and 8B are diagrams illustrating an operation in which an electronic device 101 receives coupled-device information and/or device attribute information from a first external electronic device 201 and/or a second external electronic device 202 after communication link connection according to an embodiment.

Referring to FIG. 8A, the electronic device 101 may transmit and receive a specified message after a communication link connection with the first external electronic device 201 and receive coupled-device information and/or device attribute information from the first external electronic device 201.

For example, the electronic device 101 may perform a BLE scan 802 through a channel interval 800 to receive an advertising signal 801 output from the first external electronic device 201, transmit a packet of an information request signal 805 to the first external electronic device 201 through a channel interval 804 allocated after connection of a first communication link according to transmission of a connection request signal 803, and obtain coupled-device information and/or device attribute information from the packet of a response signal 806 thereto.

Referring to FIG. 8B, the electronic device 101 may transmit and receive a specified message after a communication link connection with the second external electronic device 202, and then receive coupled-device information and/or device attribute information from the second external electronic device 202.

For example, the electronic device 101 may perform a BLE scan 812 through a channel interval 810 to receive an advertising signal 811 output from the second external electronic device 202, transmit a packet of an information request signal 815 to the second external electronic device 202 through a channel interval 814 allocated after connection of a second communication link according to transmission of a connection request signal 813, and obtain coupled-device information and/or device attribute information from the packet of a response signal 816 thereto.

According to various embodiments, the electronic device 101 may provide an integrated service for a plurality of external electronic devices (e.g., the first external electronic device 201 and the second external electronic device 202), based on the coupled-device information. According to various embodiments, the electronic device 101 may provide an integrated service for the first external electronic device 201 and the second external electronic device 202, based on the coupled-device information and the device attribute information.

According to an embodiment, the electronic device 101 may indicate, through a display (e.g., the display module 160 in FIG. 1) that the first external electronic device 201 and the second external electronic device 202 are devices included in one set, based on the coupled-device information. For example, the electronic device 101 may display the first external electronic device 201 and the second external electronic device 202 as one device, instead of as separate devices, through a unified icon or text. According to an embodiment, the electronic device 101 may display separate identifiers containing images and/or text for distinguishing functions or roles of the first external electronic device 201 and/or the second external electronic device 202 for the icons or text, based on the device attribute information. For example, the icons or text may include a device set name and images or text corresponding to wireless communication schemes of the device set. For example, the identifier may include an image or text indicating a function or role (channel role) of the external electronic device. According to an embodiment, the electronic device 101 may provide individual information of each external electronic device included in one set as an image or text. For example, the individual information may include a remaining battery level or a connection state of each external electronic device.

According to an embodiment, the electronic device 101 may provide a single user interface for integrated control of the first external electronic device 201 and the second external electronic device 202. According to another embodiment, the electronic device 101 may further provide an individual user interface to individually control the first external electronic device 201 and the second external electronic device 202.

Hereinafter, a description will be made based on an example in which the first external electronic device 201 and the second external electronic device 202 are implemented as a left wireless earphone and a right wireless earphone, respectively, which are Bluetooth wireless earphones as a set of devices.

Figure 9A:
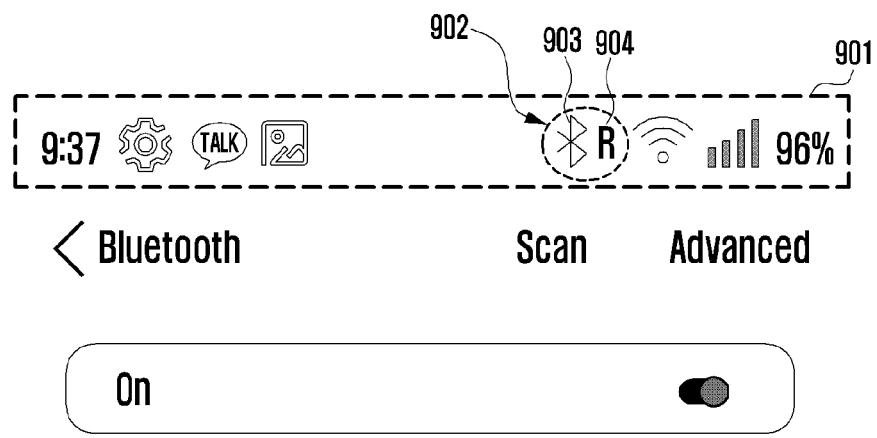
FIGS. 9A and 9B are diagrams illustrating an example in which an electronic device displays information according to connection with a plurality of external electronic devices according to an embodiment.
Figure 9B:
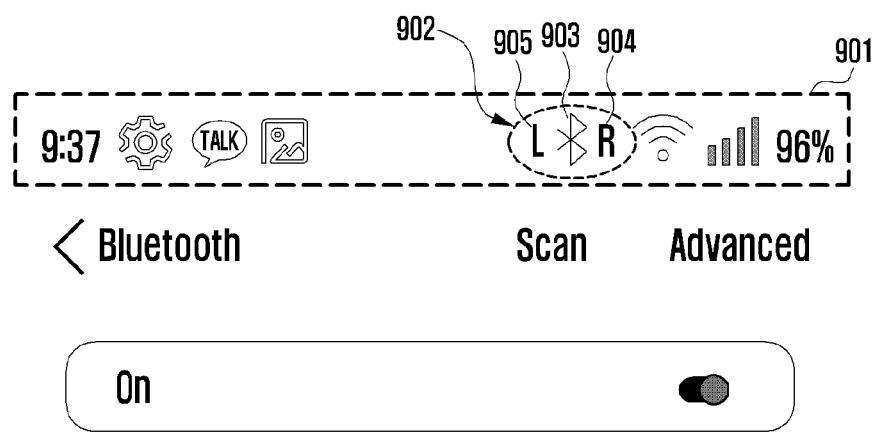

FIGS. 9A and 9B are diagrams illustrating an example in which an electronic device 101 provides an integrated service according to a communication connection with the first external electronic device 201 and/or the second external electronic device 202 according to an embodiment.

According to various embodiments, the electronic device 101 may indicate, on a display screen, that the first external electronic device 201 and the second external electronic device 201 are devices included in one set, based on coupled-device information and device attribute information of the first external electronic device 201 and the second external electronic device 202.

Referring to FIG. 9A, when the second external electronic device 202 is connected through a second communication link, the electronic device 101 may differently display an icon 903, indicating that a Bluetooth device is connected, in the shape, color, and/or brightness thereof in an area 902 displaying information related to a Bluetooth function in an indicator area 901 (e.g., an indicator bar) on a display screen.

According to an embodiment, when the electronic device 101 recognizes that the second external electronic device 202 is a Bluetooth device belonging to one set, based on the coupled-device information thereof, the electronic device 101 may display an identifier icon 904 indicating that a right wireless earphone (channel role), as a Bluetooth device belonging to one set, is connected, to be adjacent to, for example, the right of the icon 903, based on the device attribute information of the second external electronic device 202. Although the identifier icon 904 may be displayed, for example, in the area 902 displaying information related to a Bluetooth function, it may be displayed in another location, and the shape, color, and/or brightness of the identifier icon 904 may be variously modified.

Referring to FIG. 9B, when first external electronic device 201 and the second external electronic device 202 are connected through a first communication link and a second communication link, respectively, the electronic device 101 may differently display an icon 903, indicating that a Bluetooth device is connected, in the shape, color, and/or brightness thereof in an area 902 displaying information related to a Bluetooth function in the indicator area 901 on the display screen.

According to an embodiment, when the electronic device 101 recognizes that the first external electronic device 201 and the second external electronic device 202 are Bluetooth devices belonging to one set, based on the coupled-device information thereof, the electronic device 101 may display an identifier icon 905 indicating that a left wireless earphone, as a Bluetooth device belonging to one set, is connected, to be adjacent to the left of the icon 903, based on the device attribute information of the first external electronic device 201, and may display an identifier icon 904 indicating that a right wireless earphone (channel role), as a Bluetooth device belonging to one set, is connected, to be adjacent to the right of the icon 903, based on the device attribute information of the second external electronic device 202. Although the identifier icon 904 may be displayed, for example, in the area 902 displaying information related to a Bluetooth function, it may be displayed in another location, and the shape, color, and/or brightness of the identifier icon 904 may be variously modified.

As described above, although an example of recognizing that Bluetooth devices belonging to one set are connected based on coupled-device information and displaying functions or roles of the respective devices in one set, based on the device attribute information has been described with reference to FIGS. 9A and 9B, the embodiment is not limited thereto, and for example, at least one of the icon 903 or the identifier icons 904 or 905 indicating that a Bluetooth device is connected may be displayed to be different in at least one of whether or not to display the icon, the numbers, shapes, colors, and/or brightness thereof.

Figure 10A:
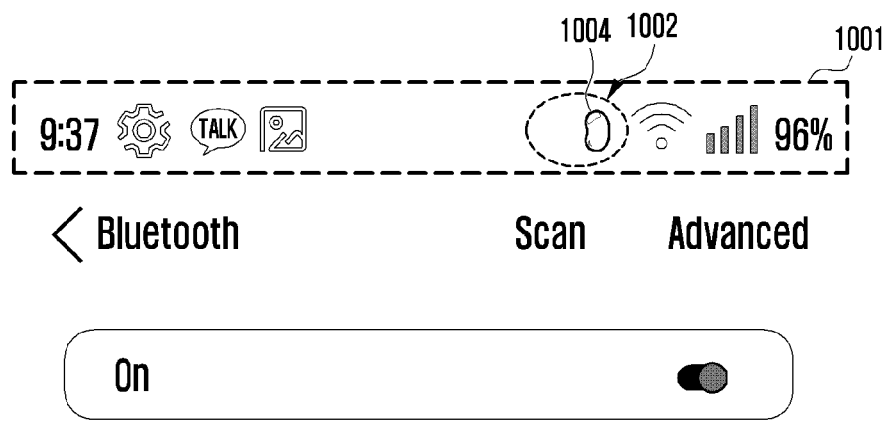
FIGS. 10A and 10B are diagrams illustrating another example in which an electronic device displays information according to a connection with a plurality of external electronic devices according to an embodiment.
Figure 10B:
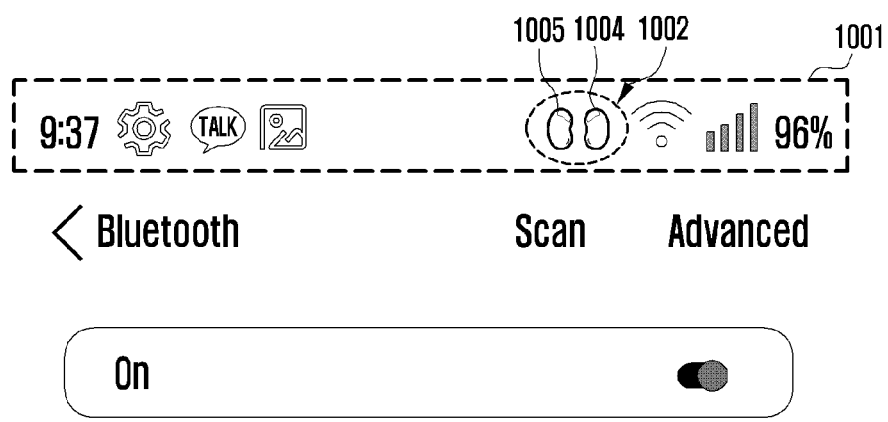

FIGS. 10A and 10B are diagrams illustrating another example in which an electronic device 101 provides an integrated service according to a communication connection with a first external electronic device 201 and/or a second external electronic device 202 according to an embodiment.

According to various embodiments, the electronic device 101 may indicate, on the display screen, that the first external electronic device 201 and the second external electronic device 201 are devices included in one set, based on the coupled-device information and the device attribute information of the first external electronic device 201 and the second external electronic device 202.

Referring to FIG. 10A, when the second external electronic device 202 is connected through the second communication link, the electronic device 101, based on the coupled-device information and device attribute information of the second external electronic device 202, may indicate that the second external electronic device 202 is a right wireless earphone belonging to one set through an icon 1004 in an area 1002 for displaying information related to a Bluetooth function in an indicator area 1001 on the display screen. Although the icon 1004 indicating that a wireless earphone is connected may be displayed, for example, in the area 1002 displaying information related to a Bluetooth function, it may be displayed in another location, and the shape, color, and/or brightness of the icon 1004 may be variously modified.

Referring to FIG. 10B, when the first external electronic device 201 and the second external electronic device 202 are connected through the first communication link and the second communication link, respectively, the electronic device 101, based on the coupled-device information and device attribute information of the first external electronic device 201 and the second external electronic device 202, may display a left icon 1005 and a right icon 1004 indicating that the left wireless earphone and the right wireless earphone belonging to one set are connected, respectively, in the indicator area 1001 on the display screen. Although the icon (e.g., the icon 1004 and the icon 1005) indicating that wireless earphones are connected may be displayed, for example, in the area 1002 displaying information related to a Bluetooth function, it may be displayed in another location, and the shape, color, and/or brightness of the icon (e.g., the icon 1004 and the icon 1005) may be variously modified.

As described above, although an example of indicating that a device performing a specified function or role in one set is connected based on the coupled-device information and device attribute information has been described with reference to FIGS. 10A and 10B, the embodiment is not limited thereto, and at least one of the icons 1004 or 1005, for example, indicating a device performing a specified function or role in one set may be displayed to be different in at least one of whether or not to display the icon, the numbers, shapes, colors, and/or brightness thereof.

Figure 11:
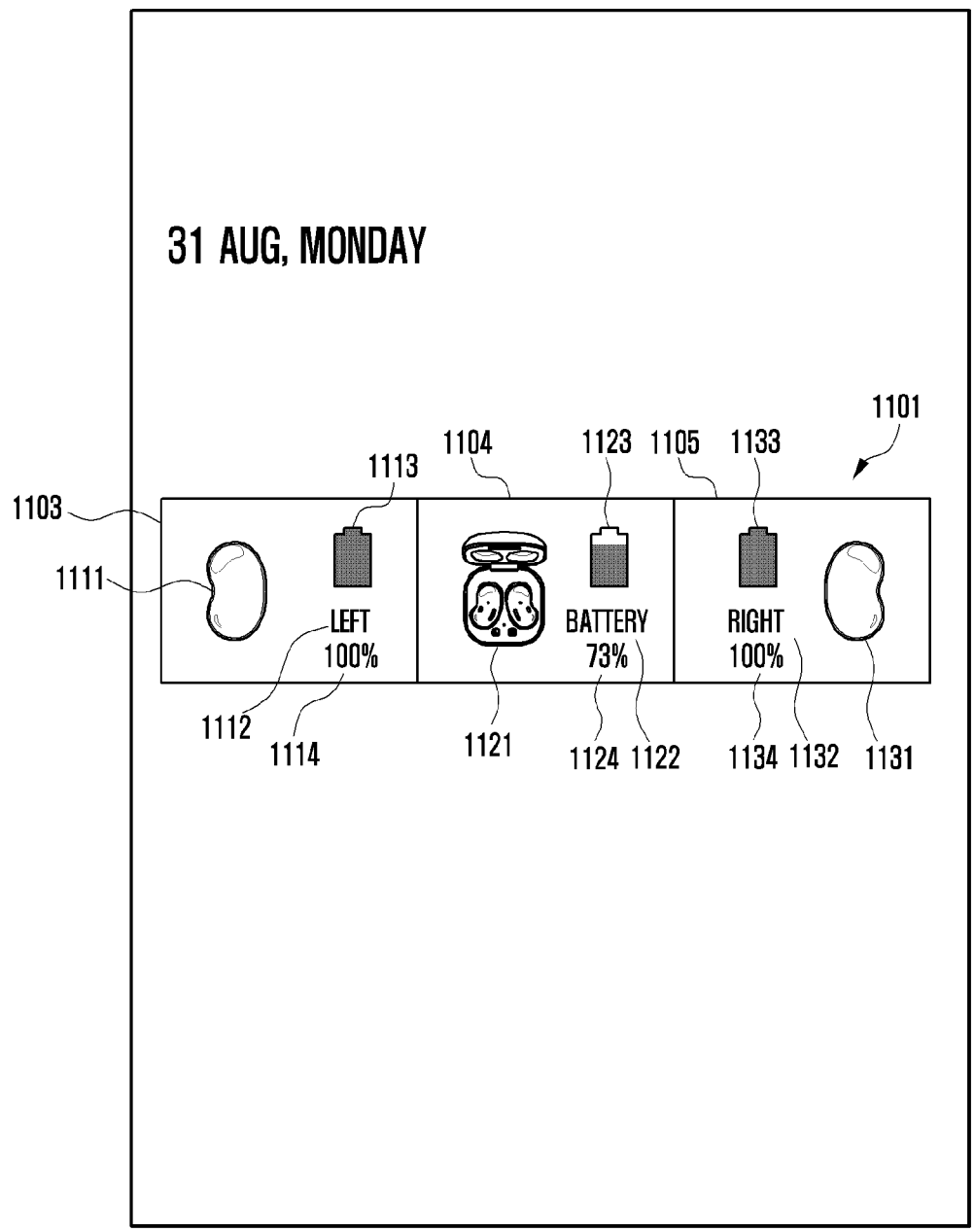
FIG. 11 is a diagram illustrating another example in which an electronic device displays information according to a connection to a plurality of external electronic devices according to an embodiment.

FIG. 11 is a diagram illustrating another example in which an electronic device provides an integrated service according to a communication connection with a plurality of external electronic devices according to an embodiment.

According to various embodiments, as the electronic device 101 is connected to the first external electronic device 201, the second external electronic device 202, and a power supply device thereof, respectively, through communication, the electronic device 101 may display information including individual information on each of the devices included in one set through a pop-up notification or a top-down display using an image and/or text, based on coupled-device information and device attribute information of each device.

Referring to FIG. 11, the electronic device 101 may display information on the first external electronic device 201, the second external electronic device 202, and the power supply device thereof through a cover 1101 including icons and/or text in a plurality of division areas on a top-down display of a display screen.

For example, the electronic device 101 may display information on the first external electronic device 201, the second external electronic device 202, and the power supply device thereof (e.g., a cradle) in the same column on the display screen so as to be adjacent to each other with a unified layout in one cover 1101, thereby indicating that the plurality of external electronic devices is a set of devices.

For example, the electronic device 101 may indicate that the first external electronic device 201 is a left wireless earphone through an image 1111 and/or text 1112 in the left division area 1103 of the cover 1101. In addition, the electronic device 101 may display the remaining battery level of the first external electronic device 201 through an image 1113 and/or text 1114.

For example, the electronic device 101 may indicate that the second external electronic device 202 is a right wireless earphone through an image 1131 and/or text 1132 in the right division area 1105 of the cover 1101. In addition, the electronic device 101 may display the remaining battery level of the second external electronic device 202 through an image 1133 and/or text 1134.

For example, the electronic device 101 may indicate that the power supply device (e.g., a cradle) is a power supply device through an image 1121 and/or text 1122 in the central division area 1104 of the cover 1101. In addition, the electronic device 101 may display the remaining battery level of the power supply device through an image 1123 and/or text 1124.

FIGS. 12A to 12E are diagrams illustrating an example in which an electronic device provides a user interface for controlling a plurality of external electronic devices according to an embodiment.

According to various embodiments, the electronic device 101, based on the coupled-device information and the device attribute information of the first external electronic device 201 and the second external electronic device 202, may provide a user interface indicating that the first external electronic device 201 and the second external electronic device 202 are devices included in one set and displaying identification information and additional information of the respective devices on the display screen for integrated control.

According to various embodiments, if the first external electronic device 201 and the second external electronic device 202 are devices included in one set, based on the coupled-device information and the device attribute information of the first external electronic device 201 and the second external electronic device 202, the first external electronic device 201 and the second external electronic device 202 may be displayed using the same address AABB as shown in the drawing, and in another embodiment, alternatively, they may be displayed to be distinguished using different addresses from each other.

Figure 12A:
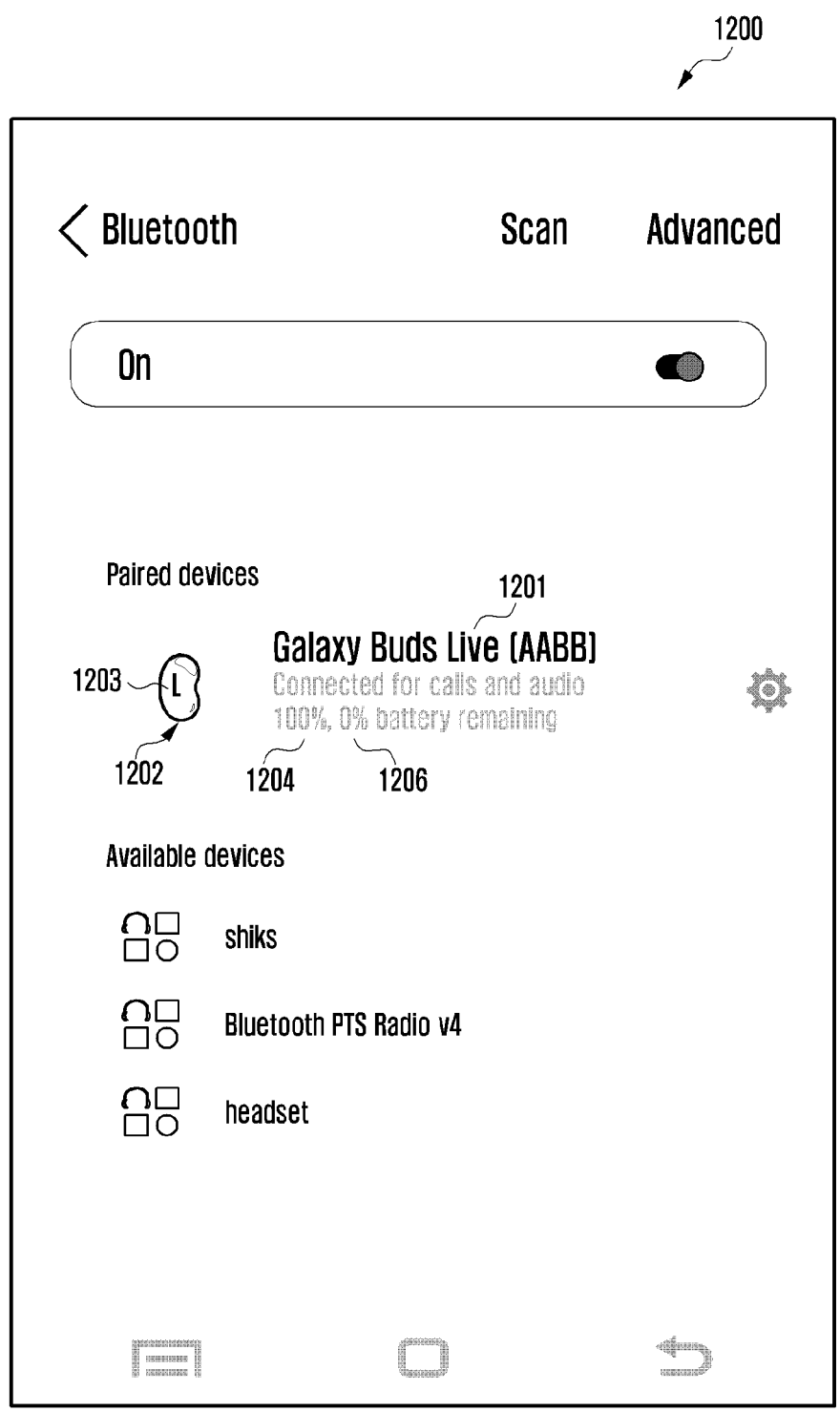
FIGS. 12A, 12B, 12C, 12D and 12E are diagrams illustrating an example in which an electronic device provides a user interface for controlling a plurality of external electronic devices according to an embodiment.

Referring to FIG. 12A, when the first external electronic device 201 is connected through a first communication link, the electronic device 101, based on the coupled-device information and device attribute information of the first external electronic device 201, may display an icon 1202 indicating that the device is a wireless earphone as one set on a device setting screen 1200 for controlling, for example, a Bluetooth device, and display text 1203 indicating a left wireless earphone on the left of the wireless earphone image in the icon 1202.

For example, the electronic device 101 may display a device name of the first external electronic device 201 as text 1201 (for example, "Galaxy Buds Live (AABB)") to indicate that the device is a wireless earphone in a set of devices. For example, the electronic device 101 may display the remaining battery level 1204 of the first external electronic device 201 and display the remaining battery level 1206 of the second external electronic device 202 as "0", thereby indicating that only the first external electronic device 201 is in the connected state.

Figure 12B:
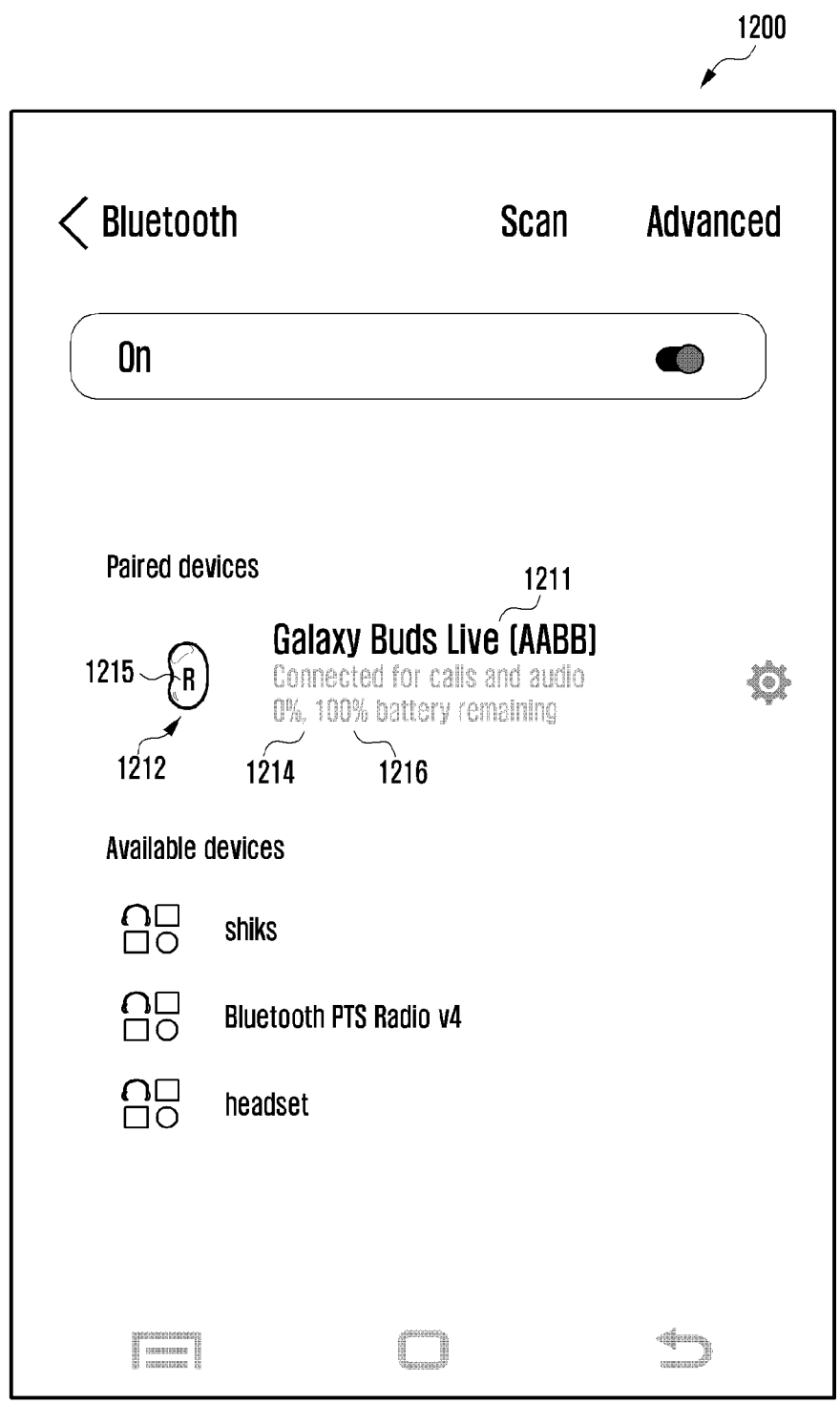

Referring to FIG. 12B, when the second external electronic device 202 is connected through a second communication link, the electronic device 101, based on the coupled-device information and device attribute information of the second external electronic device 202, may display an icon 1212 indicating that the device is a wireless earphone as one set on the device setting screen 1200 for controlling, for example, a Bluetooth device, and display text 1215 indicating a right wireless earphone on the right of the wireless earphone image in the icon 1212.

For example, the electronic device 101 may display a device name of the second external electronic device 202 as text 1211 (for example, "Galaxy Buds Live (AABB)") to indicate that the device is a wireless earphone in a set of devices. For example, the electronic device 101 may display the remaining battery level 1216 of the second external electronic device 202 and display the remaining battery level 1214 of the first external electronic device 201 as "0", thereby indicating that only the second external electronic device 202 is in the connected state.

Figure 12C:
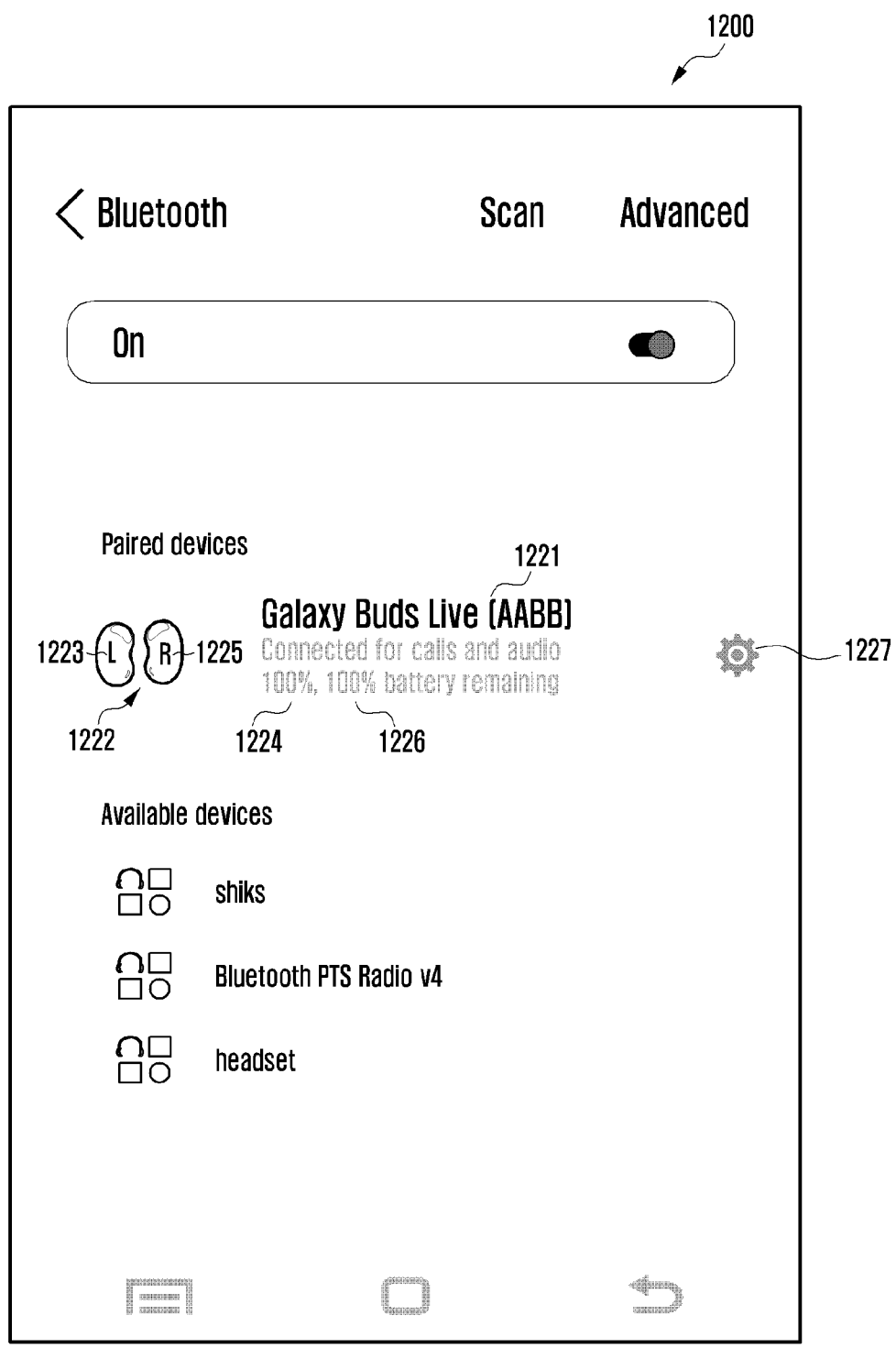

Referring to FIG. 12C, when the first external electronic device 201 is connected through a first communication link and when the second external electronic device 202 is connected through a second communication link, the electronic device 101, based on the coupled-device information and device attribute information of the first external electronic device 201 and the second external electronic device 202, may display an icon 1222 indicating that the devices are wireless earphone as one set on the device setting screen 1200 for controlling, for example, a Bluetooth device, and display text 1223 indicating a left wireless earphone on the left of the wireless earphone image in the icon 1222 and text 1225 indicating a right wireless earphone on the right thereof together.

For example, the electronic device 101 may display the device name of the first external electronic device 201 and the second external electronic device 202 as text 1221 (for example, "Galaxy Buds Live (AABB)") to indicate that the devices are wireless earphones as a set of devices. For example, the electronic device 101 may display the remaining battery level 1224 of the first external electronic device 201 and the remaining battery level 1226 of the second external electronic device 202, respectively, to indicate that both the first external electronic device 201 and the second external electronic device 202 are in the connected state.

Figure 12D:
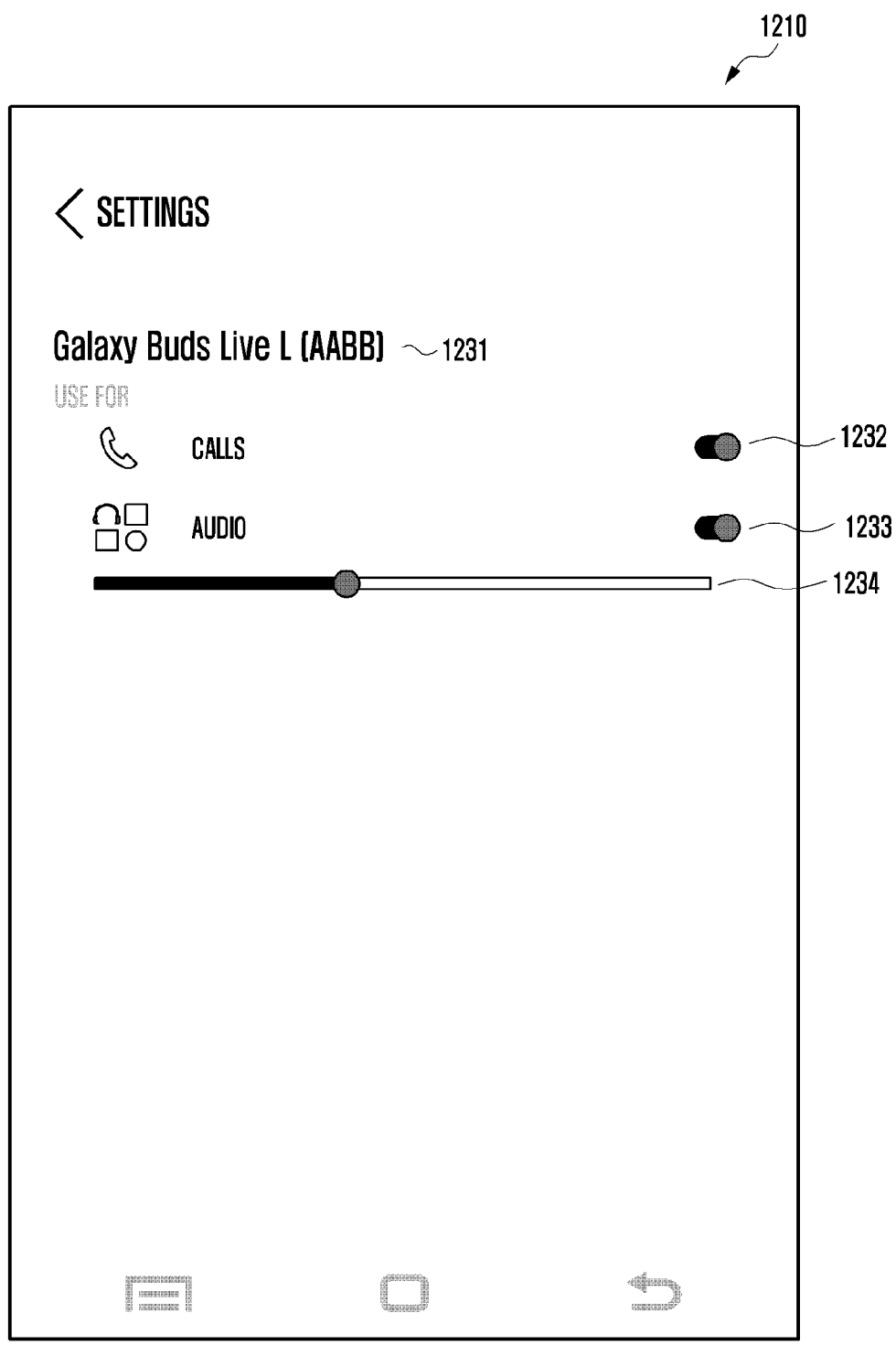

FIG. 12D illustrates an example of a user interface provided for individual control of one of a plurality of external electronic devices included in a set of devices.

For example, if a left image icon 1203 including text "L" representing a left wireless earphone is selected by, for example, long-pressing, from the device setting screen 1200 in FIG. 12A, a detailed setting screen 1210 for controlling a left wireless earphone may be provided as shown in FIG. 12D.

For example, the detailed setting screen 1210 may include text 1231 indicating that the first external electronic device 201 is included in a set of devices and performs a left earphone function in the set of devices.

For example, the detailed setting screen 1210 may display menu items for controlling the first external electronic device 201 below the text 1231 indicating the first external electronic device 201. For example, the menu items for controlling the first external electronic device 201 may include a phone use selection button 1232 and an audio use selection button 1233 for the first external electronic device 201. For example, the detailed setting screen 1210 may include a volume button 1234 for independently controlling the volume of the first external electronic device 201. Although an example of a user interface provided for individual control for one of a plurality of external electronic devices included in a set of devices has been described above, the embodiment is not limited thereto.

Figure 12E:
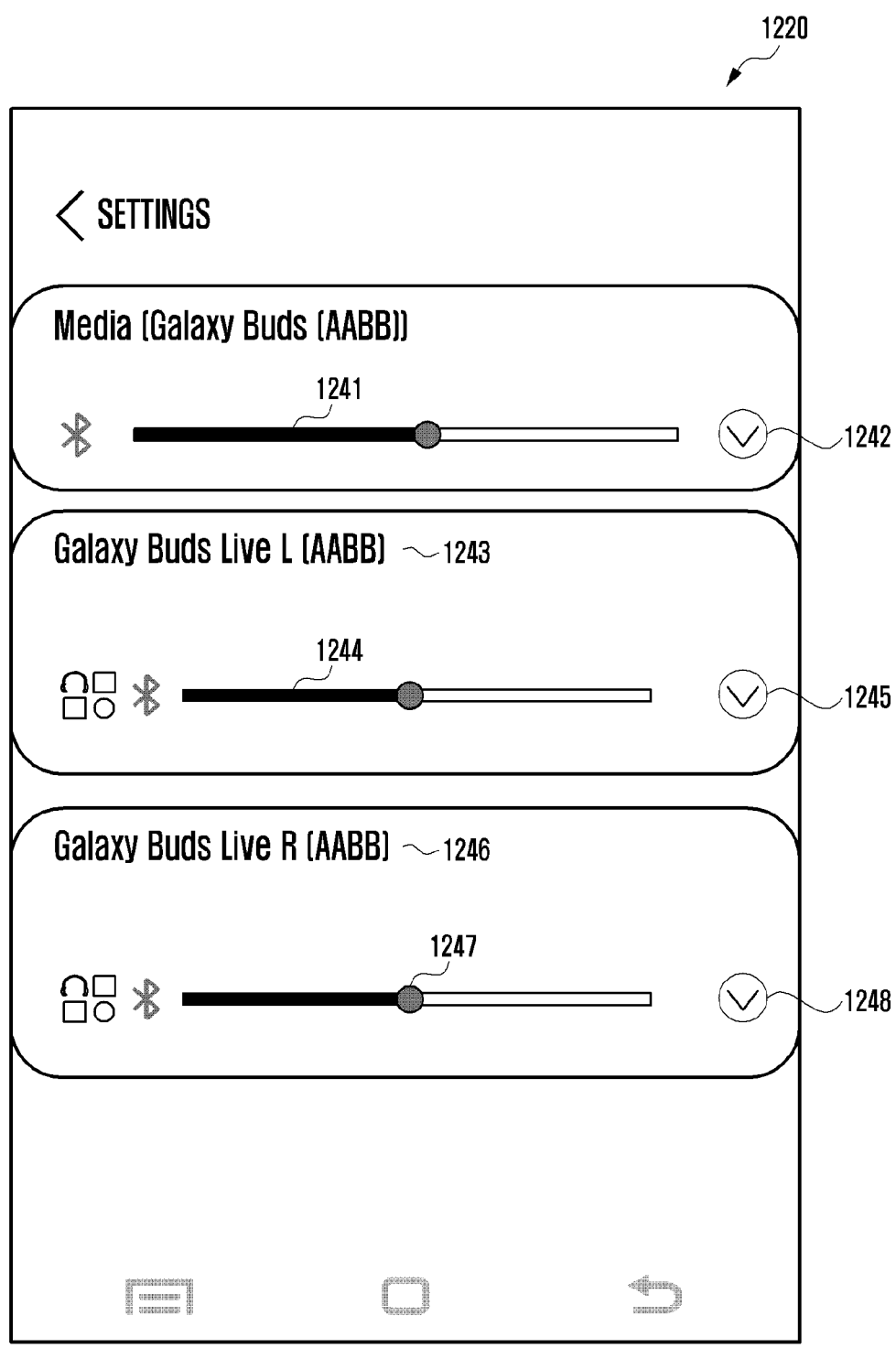

FIG. 12E shows an example of a user interface capable of individual control for a plurality of external electronic devices included in a set of devices, as well as integrated control therefor.

According to an embodiment, if an image icon 1222 is selected by, for example, long-pressing or if a setting button 1227 is selected by, for example, touching from the device setting screen 1200 in FIG. 12C, a control screen 1220 for controlling the left and right wireless earphones may be provided as shown in FIG. 12E.

According to an embodiment, the control screen 1220 for controlling the left and right wireless earphones in FIG. 12E may include a menu or icons for integrated control of the left and right wireless earphones. For example, the control screen 1220 for controlling the left and right wireless earphones may include a volume button 1241 for integrated volume control of the left and right wireless earphones and/or an on/off button 1242 for selecting on or off for a Bluetooth connection.

According to an embodiment, the control screen 1220 may provide a menu or icons for individually controlling the first external electronic device 201 and the second external electronic device 202, respectively.

According to an embodiment, the control screen 1220 may include text 1243 and 1246 respectively indicating that the first external electronic device 201 and the second external electronic device 202 are included in a set of devices and perform a left or right earphone function in the set of devices.

For example, the control screen 1220 may display menu items for controlling the first external electronic device 201 below the text 1243 indicating the first external electronic device 201. For example, the menu items for controlling the first external electronic device 201 may include a volume button 1244 for independently controlling the volume of the first external electronic device 201 and/or an on/off button 1245 for selecting on or off for a Bluetooth connection of the first external electronic device 201.

For example, the control screen 1220 may display menu items for controlling the second external electronic device 202 below the text 1246 indicating the second external electronic device 202. For example, the menu items for controlling the second external electronic device 202 may include a volume button 1247 for independently controlling the volume of the second external electronic device 202 and/or an on/off button 1248 for selecting on or off for a Bluetooth connection of the second external electronic device 202.

Although an example of a user interface capable of providing functions of integrated control and individual control for a plurality of external electronic devices included in a set of devices has been described above, the embodiment is not limited thereto.

As described above, although a user interface capable of providing functions of integrated control and individual control for a plurality of external electronic devices may be provided through a setting screen, according to another embodiment, it may be displayed on an app screen or provided through a pop-up screen or a floating screen when executing an app for outputting audio through the first external electronic device 201 and the second external electronic device 202.

Figure 13A:
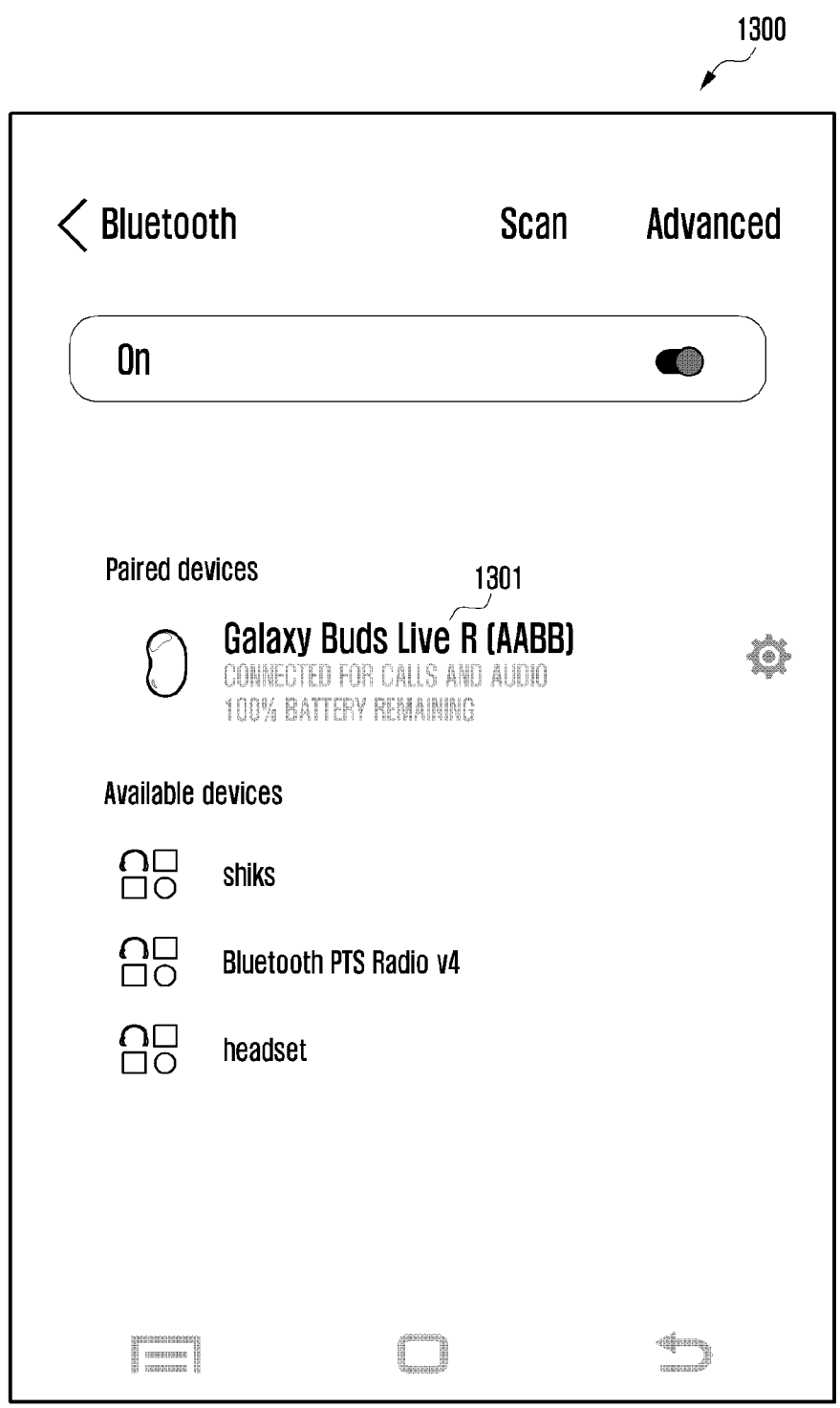
FIGS. 13A, 13B and 13C are diagrams illustrating another example in which an electronic device provides a user interface for controlling a plurality of external electronic devices according to an embodiment.
Figure 13B:
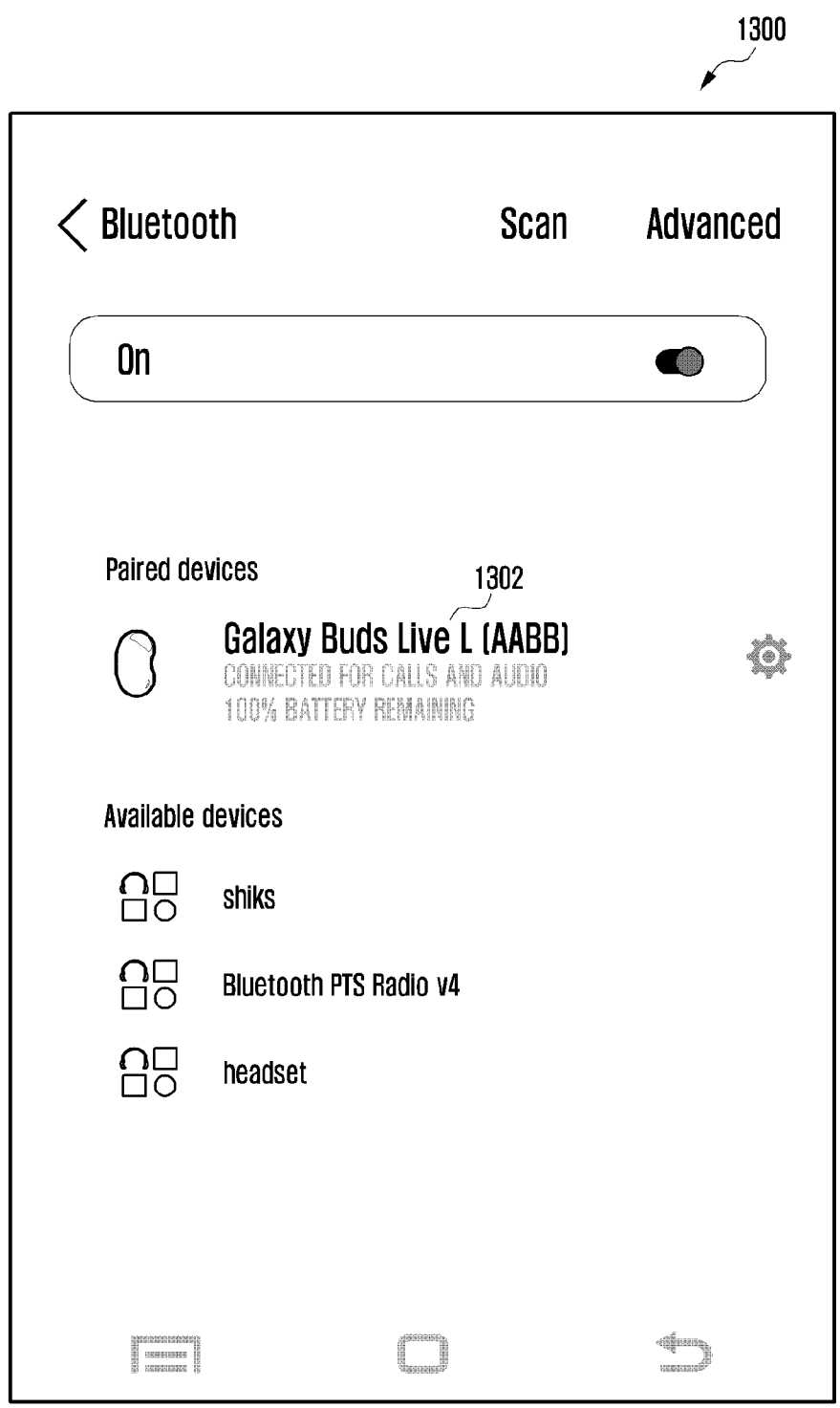
Figure 13C:
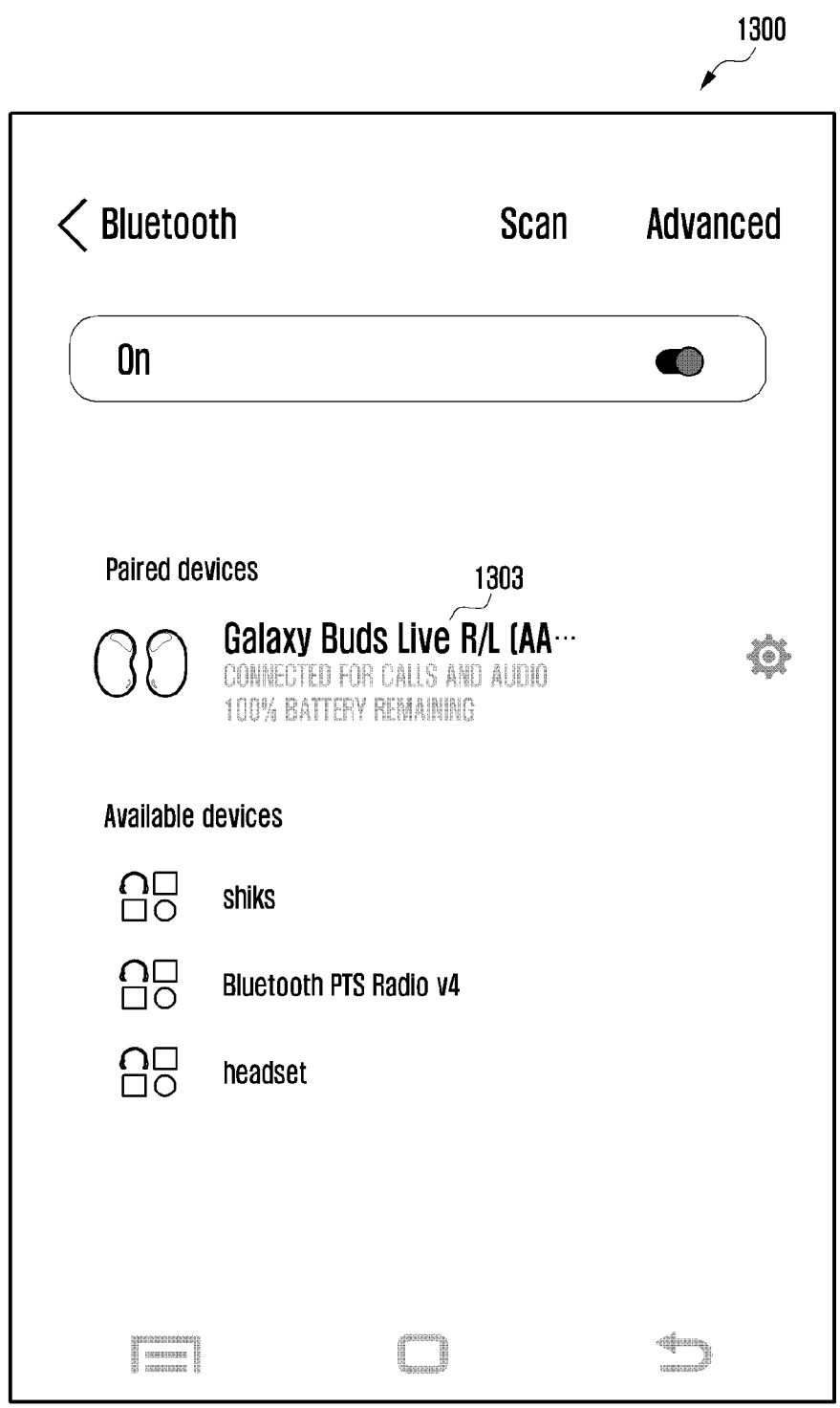

FIGS. 13A to 13C are diagrams illustrating another example in which an electronic device provides a user interface for controlling a plurality of external electronic devices according to an embodiment.

According to various embodiments, the electronic device 101 may provide a user interface indicating that the first external electronic device 201 and the second external electronic device 202 are devices included in one set, based on the coupled-device information and device attribute information thereof and displaying identification information of the respective devices and additional information on a display screen for integrated control.

Referring to FIG. 13A, in the case where the second external electronic device 202 is connected through a second communication link, the electronic device 101 may display text 1301 indicating that the second external electronic device 202 is a right wireless earphone as one set, based on the coupled-device information and device attribute information thereof, on a device setting screen 1300 for setting, for example, a Bluetooth device.

For example, the text 1301 may include the text "Galaxy Buds Live" indicating the set device name of the second external electronic device 202 and the text "R" indicating a right wireless earphone in the set. In addition, for example, the electronic device 101 may display text indicating information on the remaining battery level of the second external electronic device 202.

Referring to FIG. 13B, in the case where the first external electronic device 201 is connected through a first communication link, the electronic device 101 may display text 1302 indicating that the first external electronic device 201 is a left wireless earphone as one set, based on the coupled-device information and device attribute information thereof, on the device setting screen 1300 for setting, for example, a Bluetooth device.

For example, the text 1302 may include the text "Galaxy Buds Live" indicating the set device name of the first external electronic device 201 and the text "L" indicating a left wireless earphone in the set. In addition, for example, the electronic device 101 may display text indicating information on the remaining battery level of the first external electronic device 201.

Referring to FIG. 13C, when the first external electronic device 201 is connected through a first communication link and when the second external electronic device 202 is connected through a second communication link, the electronic device 101 may display text 1303 indicating that the first external electronic device 201 and the second external electronic device 202 are wireless earphones as one set, based on the coupled-device information and device attribute information thereof, on the device setting screen 1300 for setting, for example, a Bluetooth device.

For example, the text 1303 may include the text "Galaxy Buds Live" indicating the set device name of the first external electronic device 201 and the second external electronic device 202, the text "L" indicating a left wireless earphone in the set, and the text "R" indicating a right wireless earphone therein. In addition, for example, the text 1303 may display, as text, information indicating the remaining battery levels of the first external electronic device 201 and the second external electronic device 202.

FIGS. 14A to 14D are diagrams illustrating another example in which an electronic device provides a user interface for controlling a plurality of external electronic devices according to an embodiment According to various embodiments, the electronic device 101 may control a plurality of external electronic devices as one device or as individual devices. For example, the electronic device 101 may further provide a user interface for independently controlling each of a plurality of external electronic devices as individual devices according to selection in a user interface for common control of all of the plurality of external electronic devices, thereby enabling integrated control of the plurality of external electronic devices.

Figure 14A:
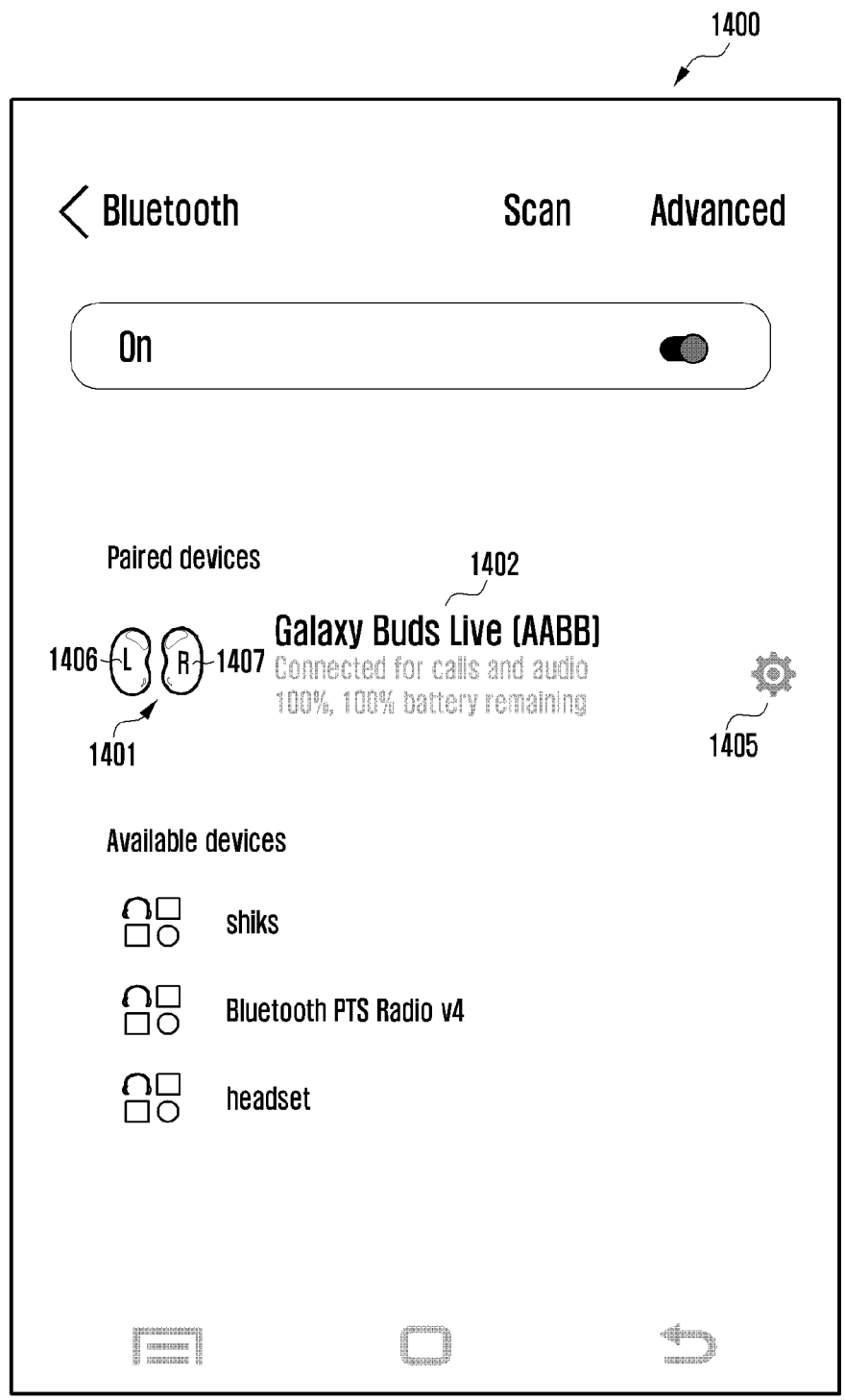
FIGS. 14A, 14B, 14C, and 14D are diagrams illustrating another example in which an electronic device provides a user interface for controlling a plurality of external electronic devices according to an embodiment.

Referring to FIG. 14A, when the first external electronic device 201 is connected through a first communication link and when the second external electronic device 202 is connected through a second communication link, the electronic device 101 may provide a user interface for controlling the first external electronic device 201 and the second external electronic device 202 as one set, based on the coupled-device information and device attribute information thereof, to a device setting screen 1400 for setting, for example, a Bluetooth device.

For example, the setting screen 1400 may display an icon 1401 and/or text 1402 indicating that the first external electronic device 201 and the second external electronic device 202 are wireless earphones as one set and that left and right wireless earphones are connected, respectively.

For example, the icon 1401 indicating wireless earphones as one set, based on the coupled-device information and device attribute information of the first external electronic device 201 and the second external electronic device 202, may display both a left image icon 1406 including text "L" representing a left wireless earphone and a right image icon 1407 including text "R" representing a right wireless earphone.

For example, the text 1402 may include text "Galaxy Buds Live" indicating the set device name of the first external electronic device 201 and the second external electronic device 202, and text indicating the remaining battery level of each of the first external electronic device 201 and the second external electronic device 202.

For example, the device setting screen 1400 may include a setting button 1405 for providing a detailed setting menu for performing more detailed control of the set of devices including the first external electronic device 201 and the second external electronic device 202.

Figure 14B:
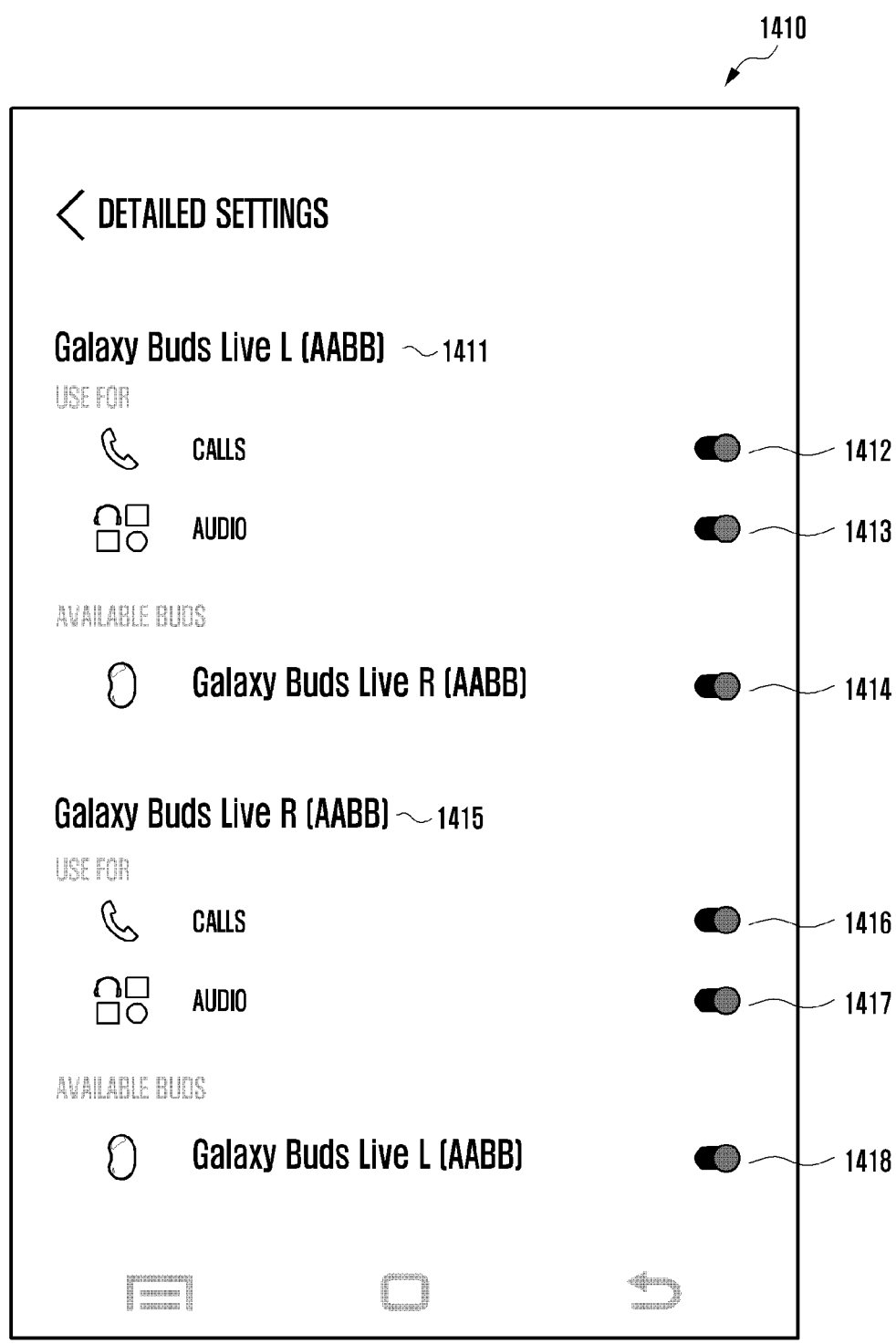

FIG. 14B illustrates an example of a user interface provided in the case where the setting button 1405 is selected on the device setting screen 1400 in FIG. 14A.

According to various embodiments, the electronic device may provide a user interface including a menu for controlling a plurality of external electronic devices included in a set of devices in common as one set of devices or independently as separate devices.

Referring to FIG. 14B, the detailed setting screen 1410 may include a set device setting menu and a detailed menu for independently controlling the respective external electronic devices included in a set of devices.

For example, the detailed setting screen 1410 may include separate text 1411 and 1415 indicating that the first external electronic device 201 and the second external electronic device 202 are included in a set of devices and perform left and right earphone functions, respectively, in the set of devices.

For example, the detailed setting screen 1410 may display menu items for controlling the first external electronic device 201 below the text 1411 indicating the first external electronic device 201. For example, the menu items for controlling the first external electronic device 201 may include a phone use selection button 1412 and an audio use selection button 1413 for the first external electronic device 201. For example, the detailed setting screen 1410 may include a button 1414 for displaying or hiding a detailed setting menu of another external electronic device (e.g., the second external electronic device 202) included in the set of devices together with the first external electronic device 201.

For example, the detailed setting screen 1410 may display menu items for controlling the second external electronic device 202 below the text 1415 indicating the second external electronic device 202. For example, the menu items for controlling the second external electronic device 202 may include a phone use selection button 1416 and an audio use selection button 1417 for the second external electronic device 202. For example, the detailed setting screen 1410 may include a button 1418 for displaying or hiding a detailed setting menu of another external electronic device (e.g., the first external electronic device 201) included in the set of devices together with the second external electronic device 202.

Figure 14C:
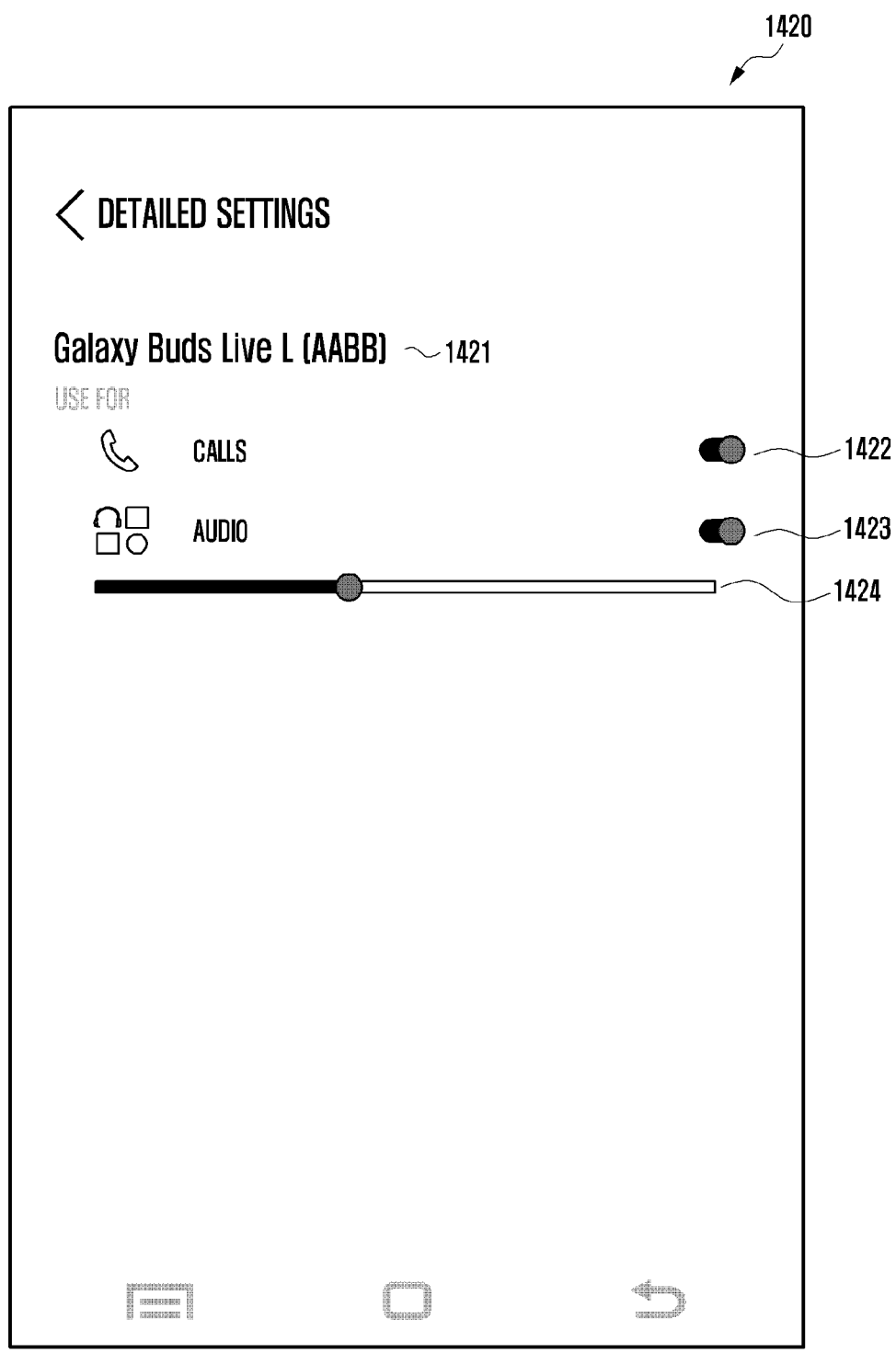

FIG. 14C illustrates an example of a user interface provided for individual control of one of a plurality of external electronic devices included in a set of devices.

For example, if a left image icon 1406 including the text "L" representing a left wireless earphone is selected by, for example, long-pressing, from the device setting screen 1400 in FIG. 14A, a detailed setting screen 1420 for controlling a left wireless earphone may be provided as shown in FIG. 14C.

For example, the detailed setting screen 1420 may include text 1421 indicating that the first external electronic device 201 is included in a set of devices and performs a left earphone function in the set of devices.

For example, the detailed setting screen 1420 may display menu items for controlling the first external electronic device 201 below the text 1421 indicating the first external electronic device 201. For example, the menu items for controlling the first external electronic device 201 may include a phone use selection button 1422 and an audio use selection button 1423 for the first external electronic device 201. For example, the detailed setting screen 1420 may include a volume button 1424 for independently controlling the volume of the first external electronic device 201.

Figure 14D:
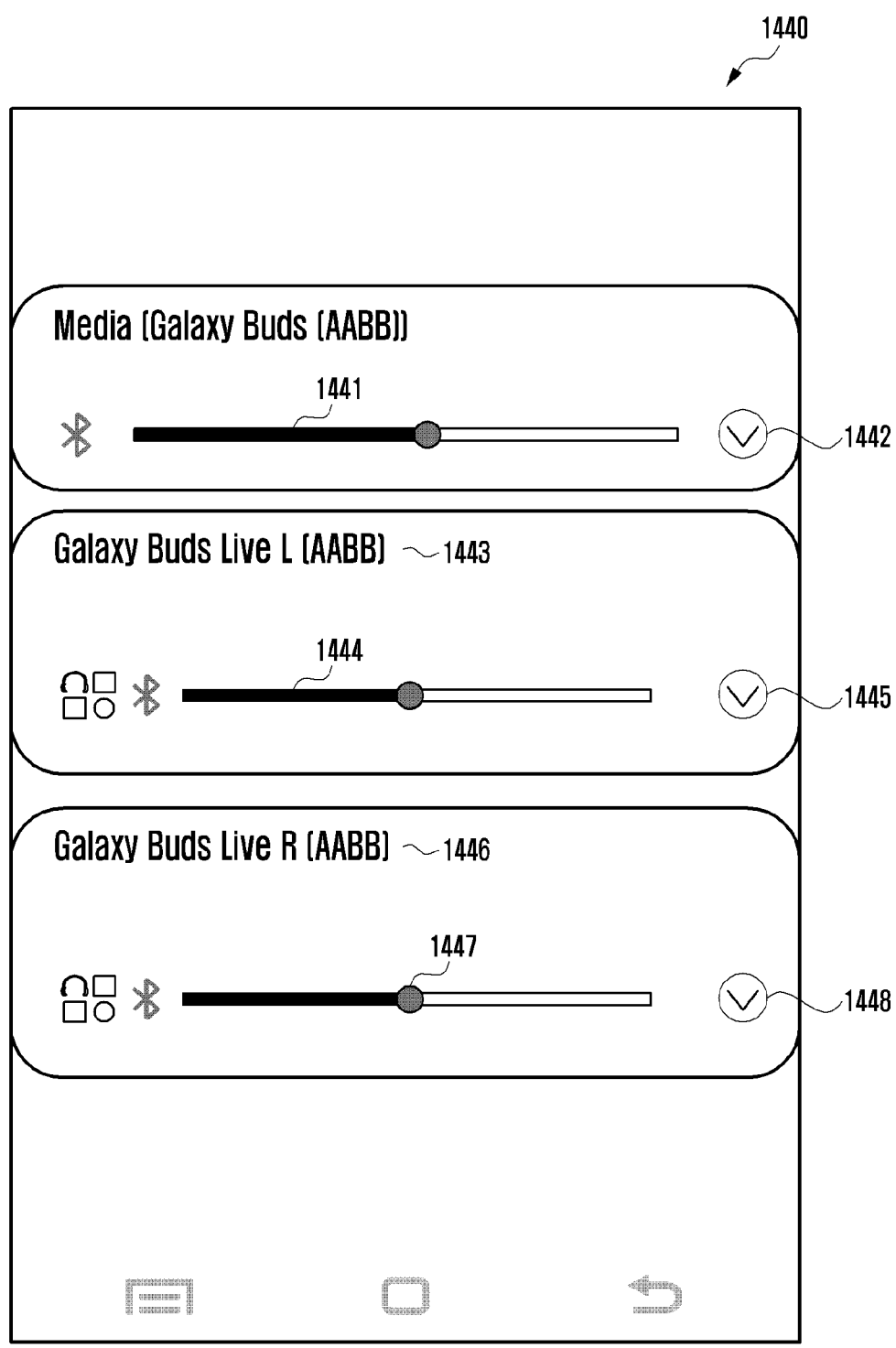

Referring to FIG. 14D, in the case where the first external electronic device 201 is connected through a first communication link and where the second external electronic device 202 is connected through a second communication link, if a setting button 1405 is selected from the device settings screen 1400 for setting (for example, a Bluetooth device), the electronic device 101, based on the coupled-device information and device attribute information of the first external electronic device 201 and the second external electronic device 202, may provide a user interface enabling control of the same as one set or individual control for each thereof.

According to an embodiment, if it is identified that the first and the second external electronic devices 201 and 202 are all worn, the electronic device 101 may provide an integrated interface. For example, if it is identified that the first external electronic device 201 and the second external electronic device 202 are worn by the same person, the electronic device 101 may provide an integrated interface.

According to an embodiment, the user interface 1440 in FIG. 14D may provide a menu or icons for integrated control of left and right wireless earphones. For example, the user interface 1440 may include a volume button 1441 for integrated volume control of the left and right wireless earphones and/or an on/off button 1442 for selecting on or off for a Bluetooth connection.

According to an embodiment, based on identifying that the first external electronic device 201 and the second external electronic device 202 are worn by different persons from each other, the electronic device 101 may provide a menu or icons for individual control. For example, in the case where the first external electronic device 201 and the second external electronic device 202 are spaced apart from each other by a specified distance or more by ranging through a wireless communication module (e.g., a UWB module) of a communication circuit (e.g., the communication circuit 310 in FIG. 3), the electronic device 101 may estimate that the devices are worn by different persons from each other. For example, the electronic device 101 may determine whether the first external electronic device 201 and the second external electronic device 202 are worn by the same person or different persons using a biometric sensor of a sensor module (e.g., the sensor module 176 in FIG. 1).

According to an embodiment, the user interface 1440 may provide a menu or icons for individually controlling each of the first external electronic device 201 and the second external electronic device 202.

According to an embodiment, the user interface 1440 may include text 1443 and 1446 indicating that the first external electronic device 201 and the second external electronic device 202 are included in a set of devices and perform left or right earphone functions in the set of devices.

For example, the user interface 1440 may display menu items for controlling the first external electronic device 201 below the text 1443 indicating the first external electronic device 201. For example, the menu item for controlling the first external electronic device 201 may include a volume button 1444 for independently controlling the volume of the first external electronic device 201 and/or an on/off button 1445 for selecting on or off for a Bluetooth connection of the first external electronic device 201.

For example, the user interface 1440 may display menu items for controlling the second external electronic device 202 below the text 1446 indicating the second external electronic device 202. For example, the menu item for controlling the second external electronic device 202 may include a volume button 1447 for independently controlling the volume of the second external electronic device 202 and/or an on/off button 1448 for selecting on or off for a Bluetooth connection of the second external electronic device 202.

Although an example of a user interface capable of providing functions of integrated control and individual control for a plurality of external electronic devices included in a set of devices has been described above, the embodiment is not limited thereto.

As described above, although a user interface capable of providing functions of integrated control and individual control for a plurality of external electronic devices may be provided through a setting screen, according to another embodiment, it may be displayed on an app screen or provided through a pop-up screen or a floating screen when executing an app for outputting audio through the first external electronic device 201 and the second external electronic device 202.

Figure 15:
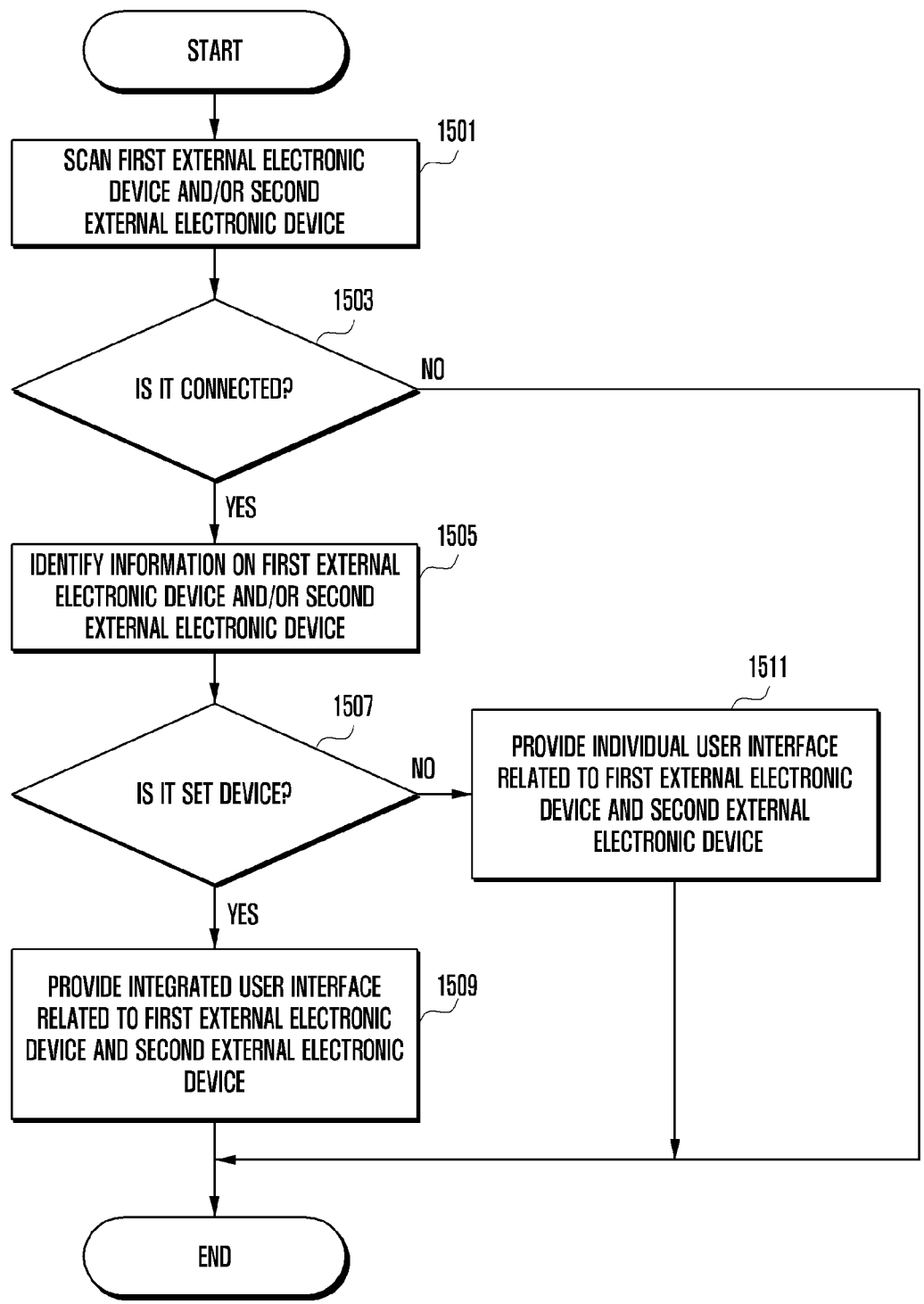
FIG. 15 is a flowchart illustrating an operation in which an electronic device provides information for control according to a connection to at least one of a plurality of external electronic devices according to an embodiment.

FIG. 15 is a flowchart illustrating an operation in which an electronic device provides information for control according to a connection to at least one of a plurality of external electronic devices according to an embodiment. FIGS. 16A to 16D are diagrams illustrating an example in which an electronic device provides a notification for control according to a connection with at least one of a plurality of external electronic devices according to an embodiment. FIGS. 17A to 17D are diagrams illustrating another example in which an electronic device provides a notification for control according to a connection with at least one of a plurality of external electronic devices according to an embodiment.

Hereinafter, the operation of an electronic device (e.g., the electronic device 101 in FIG. 1) according to various embodiments will be described with reference to FIGS. 1 to 3 and FIGS. 15 to 17D.

According to various embodiments, the electronic device 101 may be connected to a plurality of external electronic devices (e.g., the first external electronic device 201 and the second external electronic device 202 in FIG. 2) through communication links of various communication schemes (e.g., a wireless communication scheme of Bluetooth, BLE, or Wi-Fi), receive data from connected external electronic devices, and process the received data. Although an example in which the electronic device 101 is respectively connected to the first external electronic device 201 and the second external electronic device 202 shown in FIG. 2 will be described below, the disclosure is not limited thereto, and the electronic device 101 may be connected to two or more various external electronic devices, for example, three or six external electronic devices.

According to various embodiments, in operation 1501, the electronic device 101 may search for peripheral external electronic devices (e.g., BLE scan) and receive a signal (e.g., an advertising signal) including related information (e.g., device identification information and address information) for establishing communication links from the first external electronic device 201 and/or the second external electronic device 202.

According to various embodiments, in operation 1503, based on information included in the received signal as a result of searching for the peripheral devices, the electronic device 101 may identify whether or not to connect with the external electronic device (e.g., the first external electronic device 201 or the second external electronic device 202) that has transmitted the signal.

For example, the electronic device 101 may extract device identification information of the first external electronic device 201 and/or the second external electronic device 202 from the received advertising signal, and, based on the same, may display, on a display screen, a notification for confirming whether or not to connect with the first external electronic device 201 or the second external electronic device 202.

For example, in the case where the advertising signal does not include coupled-device information and/or device attribute information of the first external electronic device 201 or the second external electronic device 202, the coupled-device information and/or device attribute information of the first external electronic device 201 or the second external electronic device 202 may be identified from other signals received upon establishing communication links later.

Figure 16A:
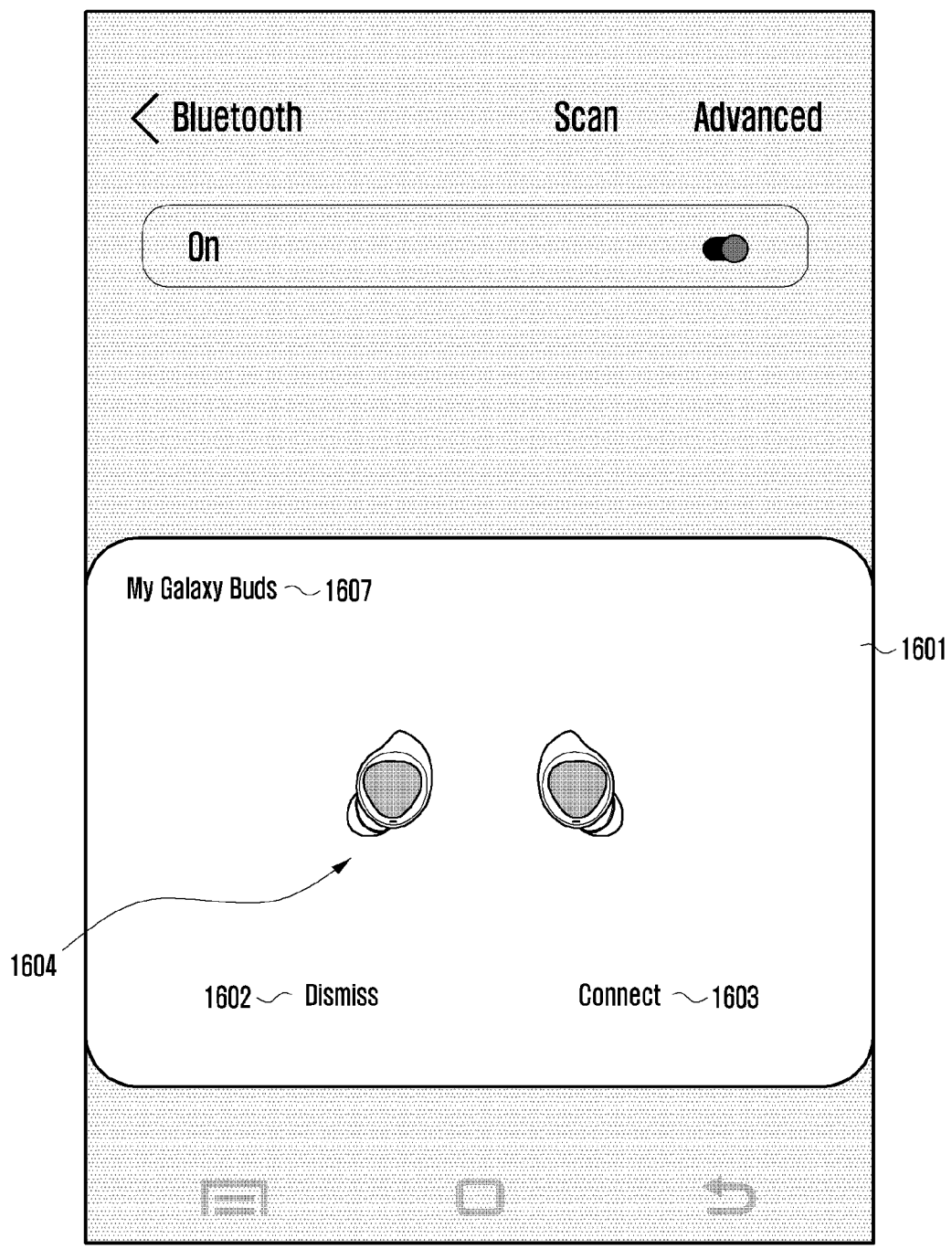
FIGS. 16A, 16B, 16C and 16D are diagrams illustrating an example in which an electronic device provides a notification for control according to a connection with at least one of a plurality of external electronic devices according to an embodiment.

Referring to FIG. 16A, the electronic device 101 may identify whether or not to connect with the first external electronic device 201 and/or the second external electronic device 202 through a notification 1601 in the form of, for example, a pop-up window. For example, the notification 1601 may provide a connection confirmation button 1602 and a connection rejection button 1603. For example, in the case where the electronic device 101 is unable to identify the coupled-device information and device attribute information of the first external electronic device 201 or the second external electronic device 202 before communication link connection, the notification 1601 may display text (e.g., My Galaxy Buds) 1607 and/or an image 1604 indicating a device type (e.g., wireless earphones), based on, for example, device identification information of the first external electronic device 201 or the second external electronic device 202.

For example, in the case where the advertising signal includes coupled-device information and/or device attribute information of the first external electronic device 201 or the second external electronic device 202, the electronic device 101 may identify that the first external electronic device 201 and the second external electronic device 202 belong to a set of devices, and display a notification based thereon.

For example, even in the case where the advertising signal does not include the coupled-device information and/or device attribute information of the first external electronic device 201 or the second external electronic device 202, if the electronic device 101 has stored coupled-device information together with related information for establishing communication links through a previous communication link connection with the first external electronic device 201 or the second external electronic device 202 or setting thereof, the electronic device 101, based on the device identification information of the first external electronic device 201 or the second external electronic device 202 extracted from the received advertising signal, may identify that the first external electronic device 201 and the second external electronic device 202 belong to a set of devices.

Figure 17A:
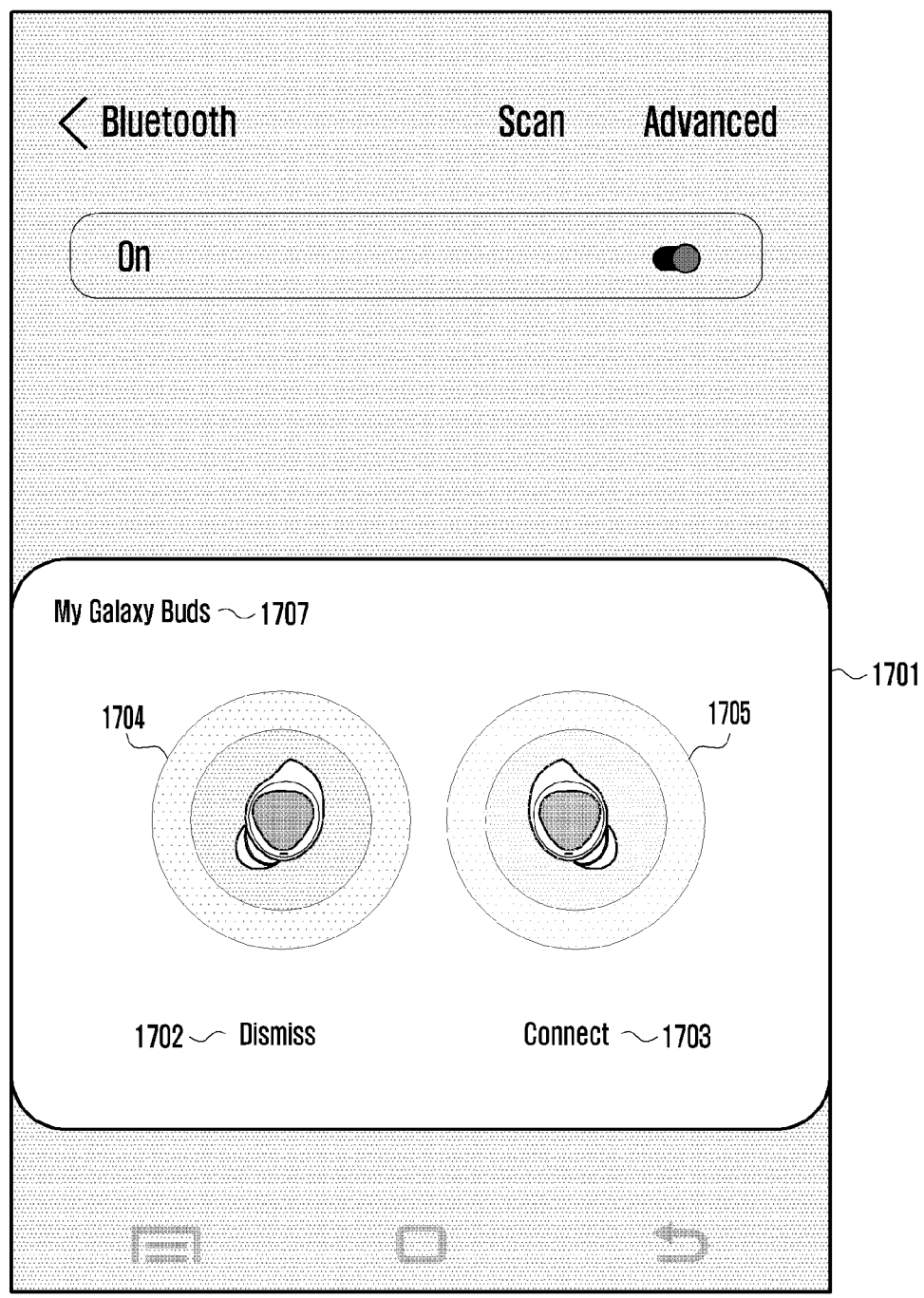
FIGS. 17A, 17B, 17C and 17D are diagrams illustrating another example in which an electronic device provides a user interface including a notification for control according to a connection with at least one of a plurality of external electronic devices.

Referring to FIG. 17A, the electronic device 101 may identify whether or not to connect with the first external electronic device 201 and/or the second external electronic device 202 through a notification 1701 in the form of, for example, a pop-up window. For example, the notification 1701 may provide a connection confirmation button 1703 and a connection rejection button 1702. For example, in the case where the electronic device 101 is able to identify the coupled-device information and/or device attribute information of the first external electronic device 201 and/or the second external electronic device 202 before or during the communication link connection, the notification 1701 may display, for example, independent icons and/or text (e.g., icons 1704 and/or 1705) indicating that the first external electronic device 201 and the second external electronic device 202 are a set of devices and indicating functions or roles of the currently connected devices, based on, for example, the coupled-device information and/or device attribute information of the first external electronic device 201 and/or the second external electronic device 202.

According to various embodiments, in operation 1505, the electronic device 101 may establish communication links with the first external electronic device 201 and/or the second external electronic device 202 and identify related information on the first external electronic device 201 and/or the second external electronic device 202.

Figure 16B:
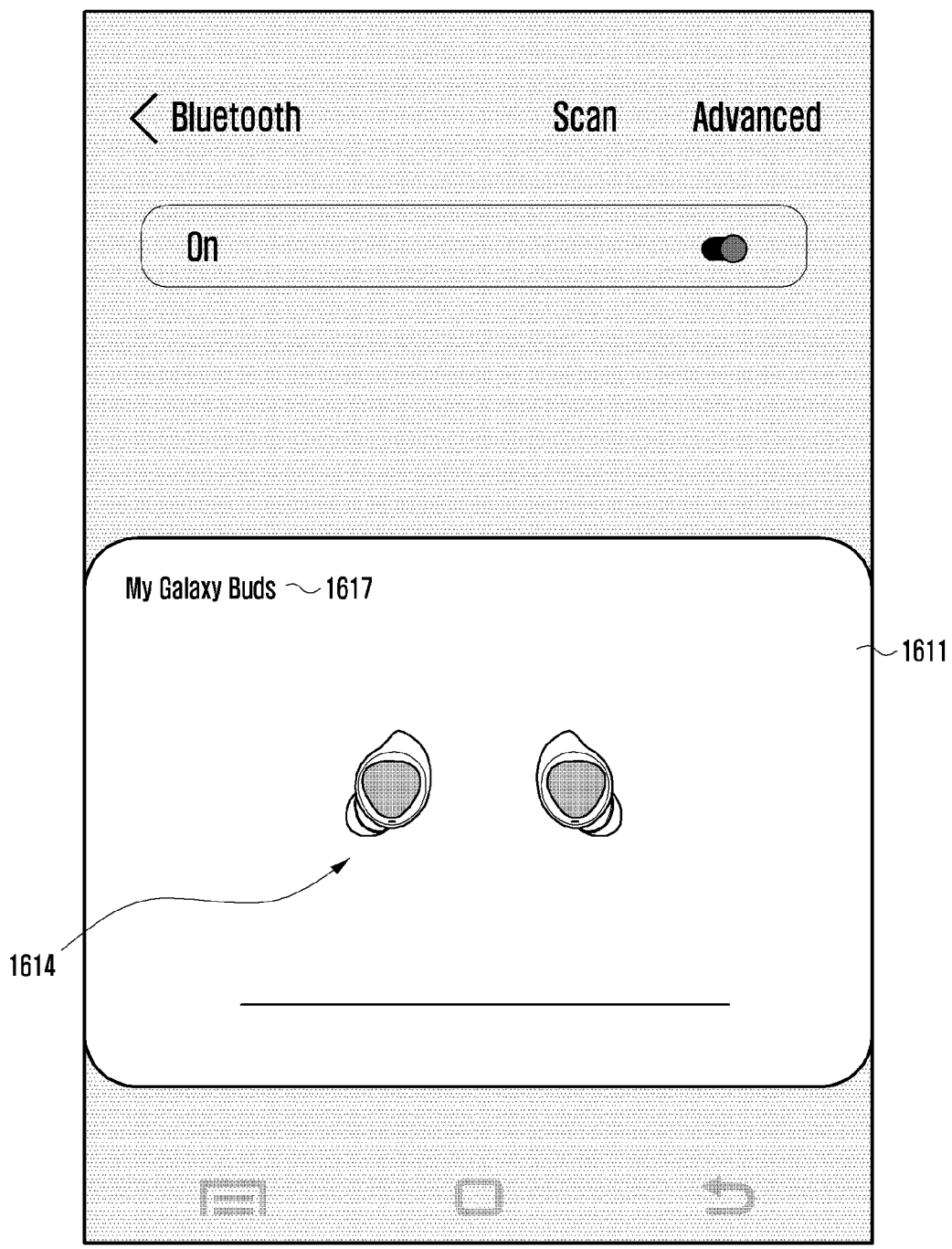

FIG. 16B illustrates an example of a notification 1611 displayed while the electronic device 101 is establishing communication links with the first external electronic device 201 and/or the second external electronic device 202. For example, in the case where the electronic device 101 is unable to identify the coupled-device information and device attribute information of the first external electronic device 201 and/or the second external electronic device 202 while establishing the communication links, a notification 1611 may display text (e.g., My Galaxy Buds) 1617 and/or images 1614 indicating a device type (e.g., wireless earphones), based on device identification information of the first external electronic device 201 or the second external electronic device 202.

According to various embodiments, in operation 1507, the electronic device 101 may determine whether or not to provide an integrated interface, based on the coupled-device information and/or device attribute information of the first external electronic device 201 and/or the second external electronic device 202.

According to various embodiments, the electronic device 101 may determine whether or not to provide an integrated interface, based on the wearing state (e.g., wearing or not wearing) of the first external electronic device 201 and/or the second external electronic device 202 or information about a wearer (e.g., the same person or different persons). For example, based on identifying that both the first external electronic device 201 and the second external electronic device 202 are worn, the electronic device 101 may provide an integrated interface. For example, based on identifying that the first external electronic device 201 and the second external electronic device 202 are worn by the same person, the electronic device 101 may provide an integrated interface. For example, based on identifying that the first external electronic device 201 and the second external electronic device 202 are worn by different persons from each other, the electronic device 101 may provide an individual control interface. For example, the electronic device 101 may perform ranging of the positions and/or distances of the first external electronic device 201 and the second external electronic device 202 through a wireless communication module (e.g., a UWB module) of a communication circuit (e.g., the communication circuit 310 in FIG. 3) and, based on the same, determine whether or not the first external electronic device 201 and the second external electronic device 202 are worn by the same person. For example, if the distance between the first external electronic device 201 and the second external electronic device 202 is less than or equal to a specified distance through ranging using a UWB module, the electronic device 101 may estimate that the devices are worn by the same person, thereby determining to provide an integrated interface. For example, the electronic device 101 may determine whether or not the first external electronic device 201 and the second external electronic device 202 are worn by the same person using a biometric sensor of a sensor module (e.g., the sensor module 176 in FIG. 1).

Figure 17B:
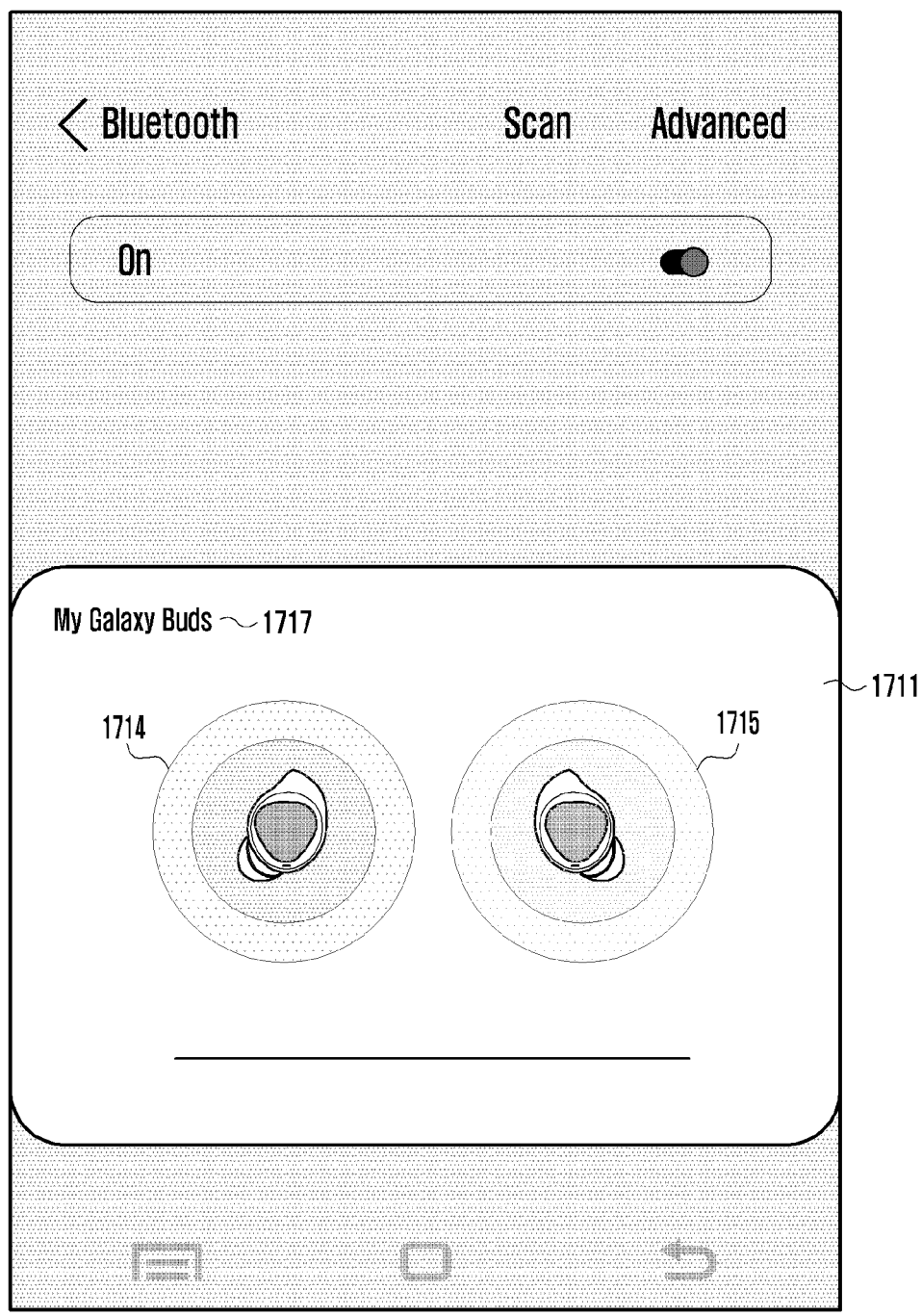

FIG. 17B illustrates an example of a notification displayed while the electronic device 101 is establishing communication links with the first external electronic device 201 and/or the second external electronic device 202.

For example, in the case where the electronic device 101 is able to identify the coupled-device information and/or device attribute information of the first external electronic device 201 and/or the second external electronic device 202 during the communication link connection, a notification 1711 may display, for example, independent icons and/or text (e.g., icons 1714 and/or 1715 in FIG. 17B) indicating that the first external electronic device 201 and the second external electronic device 202 are a set of devices and indicating functions or roles of the currently connected devices, based on, for example, the coupled-device information and/or device attribute information of the first external electronic device 201 and/or the second external electronic device 202.

According to various embodiments, the electronic device 101 may provide a user interface for integrated control according to connections of the first external electronic device 201 and/or the second external electronic device 202, based on the coupled-device information and/or device attribute information in operation 1509.

Figure 16C:
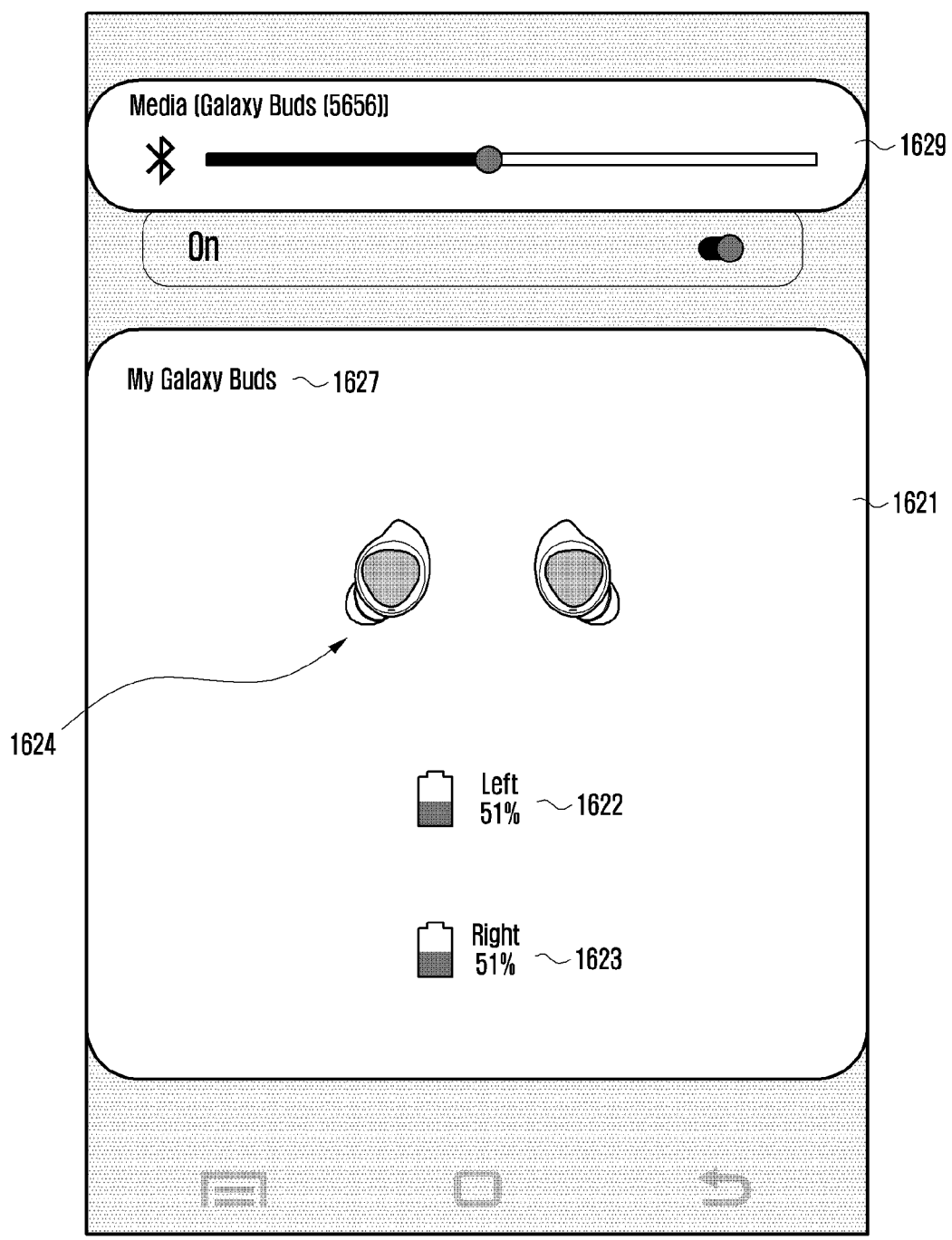

Referring to FIG. 16C, the electronic device 101 may notify that the electronic device has been connected to the first external electronic device 201 and the second external electronic device 202 through a notification 1621 in the form of, for example, a pop-up window. For example, as the electronic device 101 identifies the coupled-device information and device attribute information of the first external electronic device 201 and/or the second external electronic device 202, the notification 1621 may display information about the first external electronic device 201 (e.g., device attribute information (left) and the remaining battery level) 1622 and information about the second external electronic device 202 (e.g., device attribute information (right) and the remaining battery level) 1623 in addition to text (e.g., My Galaxy Buds) 1627 and/or images 1624 indicating the device name (e.g., wireless earphones), thereby indicating that the first external electronic device 201 and the second external electronic device 202 are a set of devices, indicating the roles of the respective devices, and indicating that all of the devices have been connected. For example, the electronic device 101 may display, on the display screen, a volume button 1629 for integrated control of the volume of the first external electronic device 201 and the second external electronic device 202 as one set of devices.

Figure 17C:
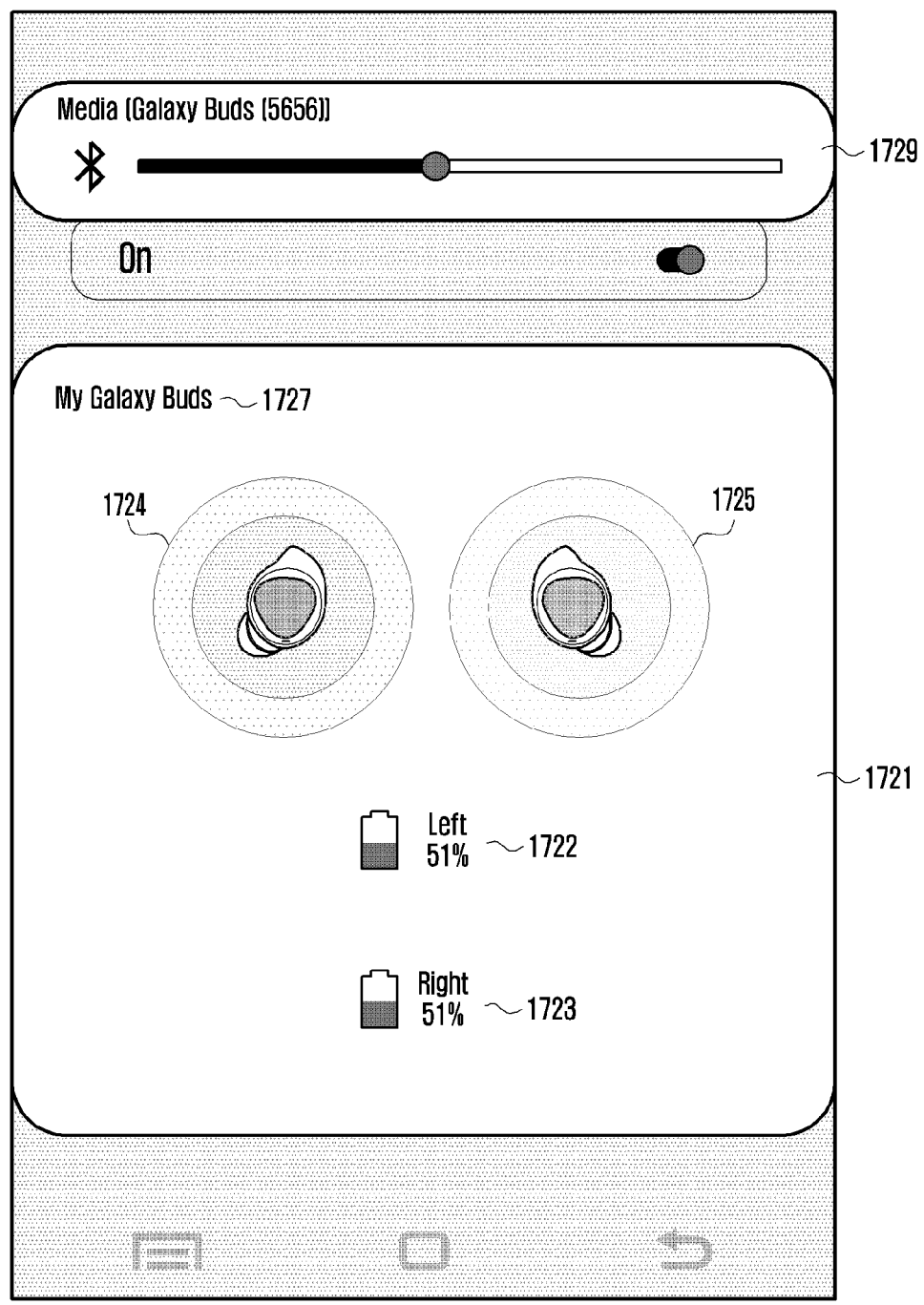

Referring to FIG. 17C, the electronic device 101 may notify that the first external electronic device 201 and the second external electronic device 202 have been connected through a notification 1721 in the form of, for example, a pop-up window. For example, as the electronic device 101 identifies the coupled-device information and device attribute information of the first external electronic device 201 and/or the second external electronic device 202, the notification 1721 may display information about the first external electronic device 201 (e.g., display device attribute information (left) and the remaining battery level) 1722 and information about the second external electronic device 202 (e.g., display device attribute information (right) and the remaining battery level) 1723 in addition to text (e.g., My Galaxy Buds) 1727 and/or images 1724 and 1725 indicating the device name (e.g., wireless earphones), thereby indicating that the first external electronic device 201 and the second external electronic device 202 are a set of devices, indicating the roles of the respective devices, and indicating that all of the devices have been connected. For example, the electronic device 101 may display, on the display screen, a volume button 1729 for integrated control of the volume of the first external electronic device 201 and the second external electronic device 202 as the one set of devices.

According to various embodiments, if the electronic device 101 determines not to provide an integrated interface in operation 1507 (e.g., in the case where only one of the devices in the set is connected), the electronic device 101 may provide a user interface displaying related information for individual control of any one of the first external electronic device 201 or the second external electronic device 202, based on the coupled-device information and/or device attribute information in operation 1511.

Figure 16D:
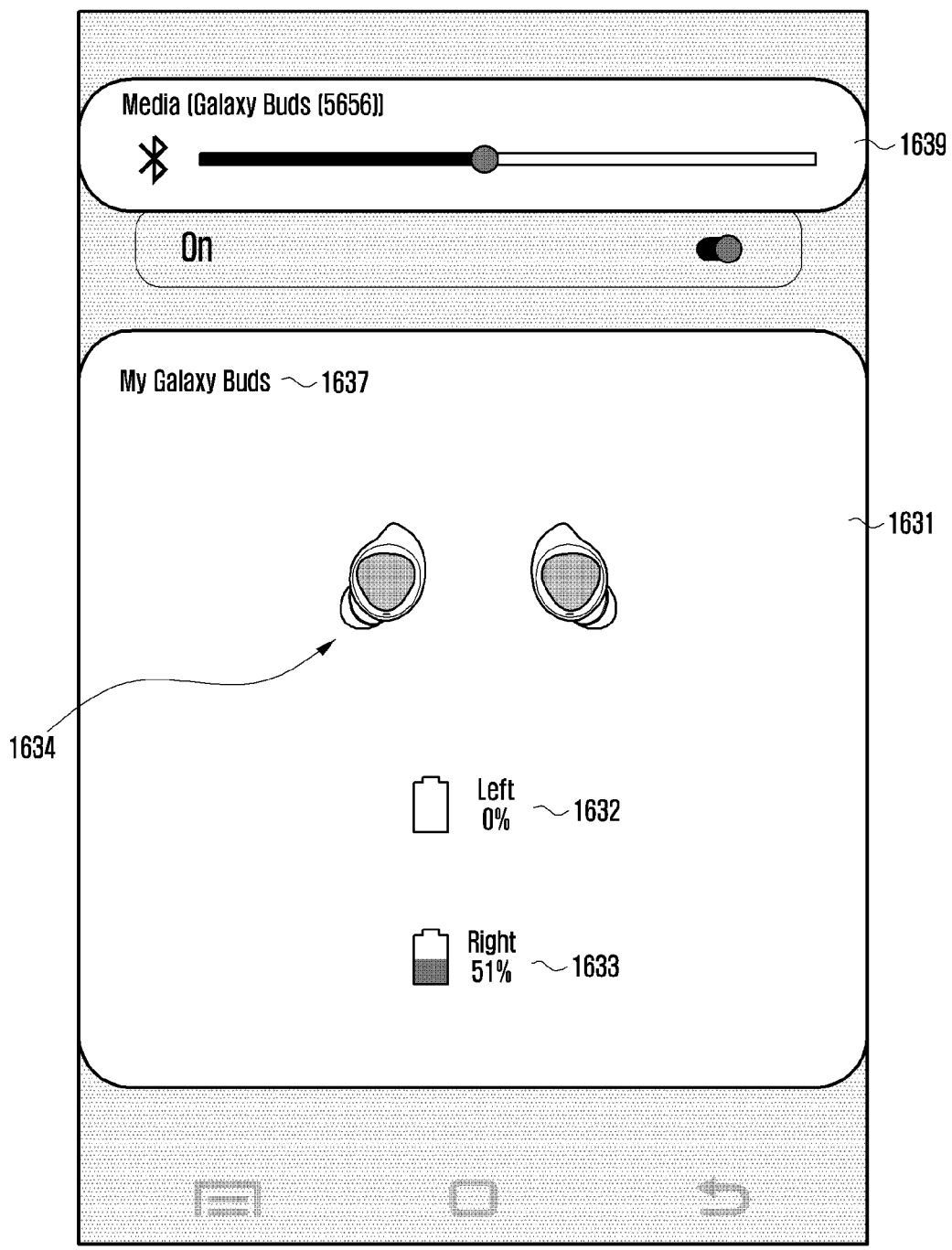

Referring to FIG. 16D, the electronic device 101 may notify that it is connected to the second external electronic device 202 through a notification 1631 in the form of, for example, a pop-up window. For example, as the electronic device 101 identifies the coupled-device information and device attribute information of the second external electronic device 202, the notification 1631 may display device attribute information (e.g., right) and additional information (e.g., the remaining battery level 1633) of the second external electronic device 202 in addition to text (e.g., My Galaxy Buds) 1637 and/or an image 1634 indicating the device name (e.g., wireless earphones). For example, the notification 1631 may display additional information, for example, the remaining battery level as "0" 1622 along with the device attribute information (e.g., left) of the first external electronic device 201, which is one set device, based on the coupled-device information of the second external electronic device 202, thereby indicating that the first external electronic device 201 is not connected. For example, the electronic device 101 may display, on the display screen, a volume button 1639 for adjusting the volume of the connected second external electronic device 202 inside or separately from the notification 1621.

Figure 17D:
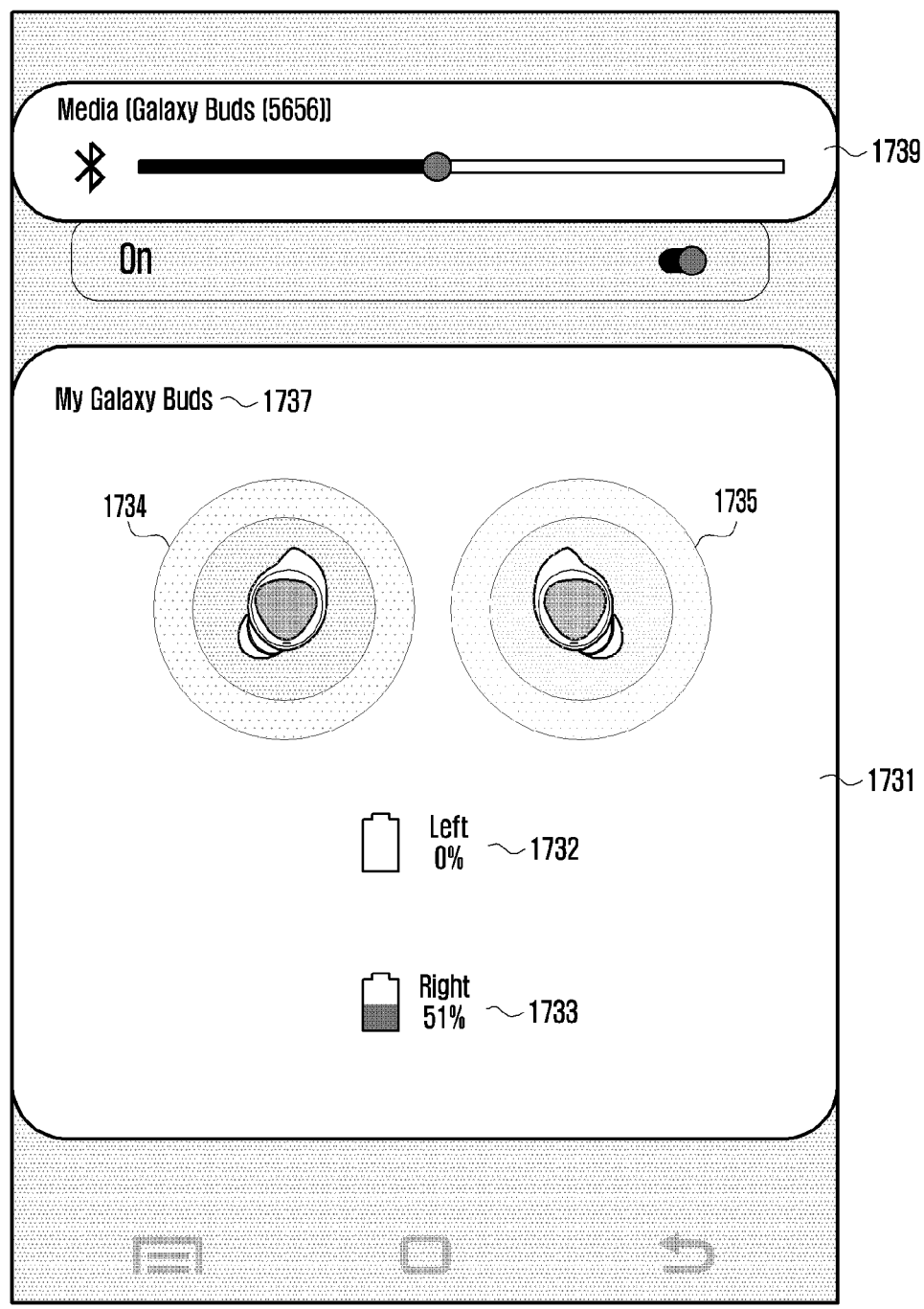

Referring to FIG. 17D, the electronic device 101 may notify that it is connected to the second external electronic device 202 through a notification 1731 in the form of, for example, a pop-up window. For example, as the electronic device 101 identifies the coupled-device information and device attribute information of the second external electronic device 202, the notification 1731 may display text (e.g., My Galaxy Buds) 1737 and/or images 1734 and 1735 indicating the device name (e.g., wireless earphones). For example, the notification 1731 may display device attribute information (e.g., right) and additional information (e.g., the remaining battery level 1733) of the second external electronic device 202. For example, the notification 1731, based on the coupled-device information of the second external electronic device 202, may differently display the color and/or brightness of the image (e.g., an image 1734) representing the first external electronic device 201, which is one set device, thereby indicating that the first external electronic device 201 is not connected. For example, the notification 1731 may display additional information, for example, the remaining battery level as "0" 1732 along with the device attribute information (e.g., left) of the first external electronic device 201, which is one set device, based on the coupled-device information of the second external electronic device 202, thereby indicating that the first external electronic device 201 is not connected. For example, the electronic device 101 may display, on the display screen, a volume button 1739 for adjusting the volume of the connected second external electronic device 202 inside or separately from the notification 1731.

The embodiments disclosed in this document are merely presented as examples for facilitating explanation and understanding of technical content, and are not intended to limit the scope of the technology disclosed in this document. Therefore, the scope of the technology disclosed in this document should be construed to encompass all changes or modifications derived from the technical ideas of various embodiments disclosed in this document in addition to the embodiments disclosed herein.

The invention claimed is:

1. An electronic device comprising:
a display;
a communication circuit;
memory storing instructions; and
a processor,
wherein the instructions, when executed by the processor, cause the electronic device to:
control the communication circuit to connect a first external electronic device with a first communication link and a second external electronic device with a second communication link different from the first communication link,
receive, from the first external electronic device through the first communication link, first coupled-device information indicating an external electronic device operating as a pair with the first external electronic device,
receive, from the second external electronic device through the second communication link, second coupled-device information indicating an external electronic device operating as a pair with the second external electronic device,
identify that the first external electronic device and the second external electronic device operate as a pair based on the first coupled-device information and the second coupled-device information,
control the display to display a first user interface comprising an icon indicating that the first external electronic device and the second external electronic device operate as a pair, and
based on receiving a user input on the icon, control the display to display, through the first user interface, both a first menu for simultaneous control the first external electronic device and the second external electronic device and a second menu for individual control of each of the first external electronic device and the second external electronic device.

2. The electronic device according to claim 1, wherein the instructions, when executed by the processor, cause the electronic device to control the display to display role information of at least one external electronic device among the first external electronic device and the second external electronic device on the first user interface, based on device attribute information of the at least one external electronic device.

3. The electronic device according to claim 1, wherein the instructions, when executed by the processor, cause the electronic device to:
obtain the first coupled-device information from a signal received from the first external electronic device for establishing the first communication link, and
obtain the second coupled-device information from a signal received from the second external electronic device for establishing the second communication link.

4. The electronic device according to claim 1, wherein the instructions, when executed by the processor, cause the electronic device to:
control the communication circuit to transmit a request through the first communication link and a request through the second communication link, and
obtain the first coupled-device information from a response signal to the request from the first external electronic device and the second coupled-device information from a response signal to the request from the second external electronic device.

5. The electronic device according to claim 1, wherein the instructions, when executed by the processor, cause the electronic device to control the display to display, through the first user interface, a currently connected external electronic device and a currently unconnected external electronic device, among the first external electronic device and the second external electronic device.

6. The electronic device according to claim 1, wherein the instructions, when executed by the processor, cause the electronic device to:
store at least one of the first coupled-device information and the second coupled-device information in the memory, and
based on receiving a communication link connection request from the first external electronic device or the second external electronic device, control the display to display a notification identifying whether to connect with the first external electronic device or the second external electronic device and an indication that the first external electronic device and the second external electronic device operate as a pair.

7. A method of operating an electronic device, the method comprising:
connecting with a first external electronic device with a first communication link and a second external electronic device with a second communication link different from the first communication link;
receiving, from the first external electronic device through the first communication link, first coupled-device information indicating an external electronic device operating as a pair with the first external electronic device;
receiving, from the second external electronic device through the second communication link, second coupled-device information indicating an external electronic device operating as a pair with the second external electronic device;
identifying that the first external electronic device and the second external electronic device operate as a pair based on the first coupled-device information and the second coupled-device information,
displaying, by a display of the electronic device, a first user interface comprising an icon indicating that the first external electronic device and the second external electronic device operate as a pair; and
based on receiving a user input on the icon, displaying by this display and through the first user interface, both a first menu for simultaneous control the first external electronic device and the second external electronic device and a second menu for individual control of each of the first external electronic device and the second external electronic device.

8. The method according to claim 7, wherein the displaying the first user interface comprises displaying role information of at least one external electronic device among the first external electronic device and the second external electronic device on the first user interface, based on device attribute information of the at least one external electronic device.

9. The method according to claim 7, wherein the receiving the first coupled-device information further comprises obtaining the first coupled-device information from a signal received from the first external electronic device for establishing the first communication link, and wherein the receiving the second coupled-device information further comprises obtaining the second coupled-device information from a signal received from the second external electronic device for establishing the second communication link.

10. The method according to claim 7, wherein the receiving the first coupled-device information further comprises:

transmitting a request through the first communication link of the first external electronic device, and obtaining the first coupled-device information from a response signal to the request from the first external electronic device, and wherein the receiving the second coupled-device information further comprises:

transmitting a request through the second communication link of the second external electronic device, and obtaining the second coupled-device information from a response signal to the request from the second external electronic device.

11. The method according to claim 7, wherein the displaying the first user interface further comprises displaying, through the first user interface, a currently connected external electronic device and a currently unconnected external electronic device, among the first external electronic device and the second external electronic device.

12. The method according to claim 7, further comprising:

storing at least one of the first coupled-device information and the second coupled-device information in a memory of the electronic device, and based on receiving a communication link connection request from the first external electronic device or the second external electronic device, displaying a notification identifying whether to connect with the first external electronic device or the second external electronic device and information indicating that the first external electronic device and the second external electronic device operate as a pair.

* * * * *